(12) United States Patent
Otsuka

(10) Patent No.: US 11,659,153 B2
(45) Date of Patent: May 23, 2023

(54) IMAGE DATA TRANSMISSION METHOD, CONTENT PROCESSING APPARATUS, HEAD-MOUNTED DISPLAY, RELAY APPARATUS AND CONTENT PROCESSING SYSTEM

(71) Applicant: Sony Interactive Entertainment Inc., Tokyo (JP)

(72) Inventor: Katsushi Otsuka, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/825,317

(22) Filed: Mar. 20, 2020

(65) Prior Publication Data
US 2020/0314407 A1 Oct. 1, 2020

(30) Foreign Application Priority Data

Mar. 29, 2019 (JP) .............................. JP2019-068189
Oct. 8, 2019 (JP) .............................. JP2019-185341

(51) Int. Cl.
| | |
|---|---|
| *H04N 13/194* | (2018.01) |
| *H04N 13/161* | (2018.01) |
| *H04N 13/207* | (2018.01) |
| *H04N 13/344* | (2018.01) |
| *H04N 13/156* | (2018.01) |
| *G06T 7/38* | (2017.01) |

(52) U.S. Cl.
CPC .............. *H04N 13/194* (2018.05); *G06T 7/38* (2017.01); *H04N 13/156* (2018.05); *H04N 13/161* (2018.05); *H04N 13/207* (2018.05); *H04N 13/344* (2018.05); *G06T 2207/20221* (2013.01); *G06T 2207/20228* (2013.01)

(58) Field of Classification Search
CPC . G06T 2207/20221; G06T 2207/20228; G06T 7/38; H04N 13/106; H04N 13/111; H04N 13/161; H04N 13/194; H04N 13/207; H04N 13/239; H04N 13/344; H04N 5/272; H04N 5/3572; H04N 13/156
See application file for complete search history.

(56) References Cited

U.S. PATENT DOCUMENTS

| | | | | |
|---|---|---|---|---|
| 6,597,819 | B1 * | 7/2003 | Ito ........................... | G06T 5/003 |
| | | | | 358/525 |
| 10,045,029 | B2 * | 8/2018 | Akenine-Moller | ..... G06T 11/00 |
| 2003/0053797 | A1 * | 3/2003 | Oshima ................ | H04N 19/597 |
| | | | | 348/E13.059 |
| 2009/0244651 | A1 * | 10/2009 | Aoshima .................. | H04N 1/10 |
| | | | | 358/474 |
| 2010/0045831 | A1 * | 2/2010 | Tanizoe ............. | H04N 9/04515 |
| | | | | 348/273 |
| 2011/0205227 | A1 * | 8/2011 | Fischer ..................... | G06T 5/50 |
| | | | | 345/419 |

(Continued)

*Primary Examiner* — Ming Wu
(74) *Attorney, Agent, or Firm* — Katten Muchin Rosenman LLP

(57) ABSTRACT

Disclosed herein is an image data transmission method including, by an image generation apparatus, generating an image to be merged with a display image and data of an α value representative of a transparency of a pixel of the image to be merged, generating data for merging representing the image to be merged and the data of the α value on one image plane, and transmitting the data for merging to an apparatus that generates the display image.

24 Claims, 15 Drawing Sheets

(56) References Cited

U.S. PATENT DOCUMENTS

| | | | | |
|---|---|---|---|---|
| 2012/0293706 A1* | 11/2012 | Usui | ............ | H04N 9/04515 |
| | | | | 348/345 |
| 2014/0364212 A1* | 12/2014 | Osman | ............ | A63F 13/26 |
| | | | | 463/31 |
| 2015/0213586 A1* | 7/2015 | Koike | ............ | G06T 5/007 |
| | | | | 382/284 |
| 2017/0046819 A1* | 2/2017 | Sambongi | ............ | G06T 7/593 |

* cited by examiner

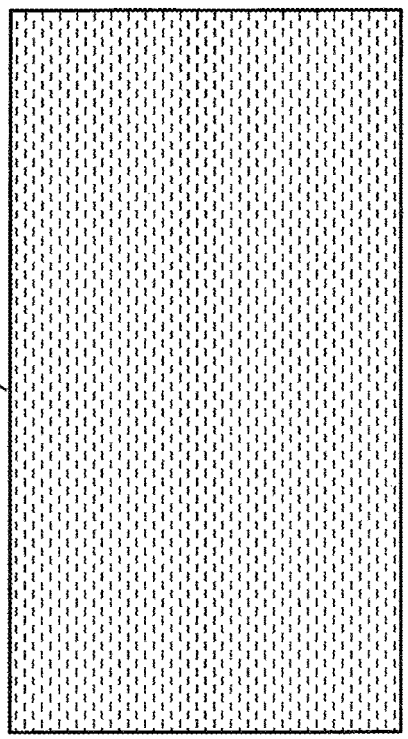
FIG. 6A
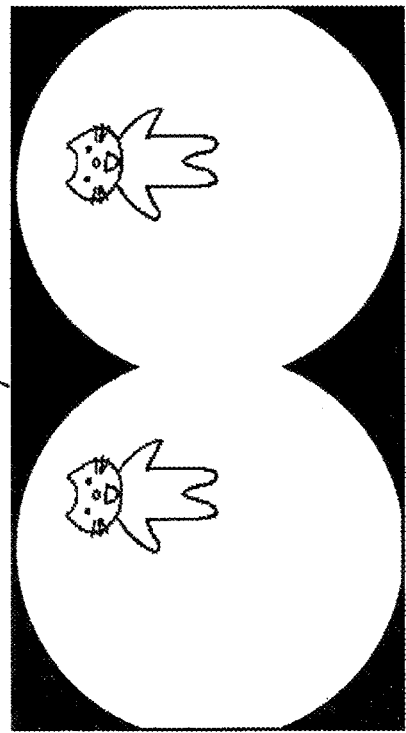
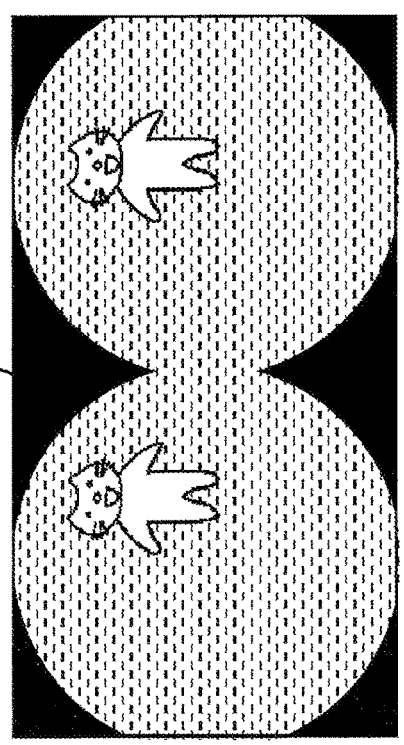
FIG. 6B

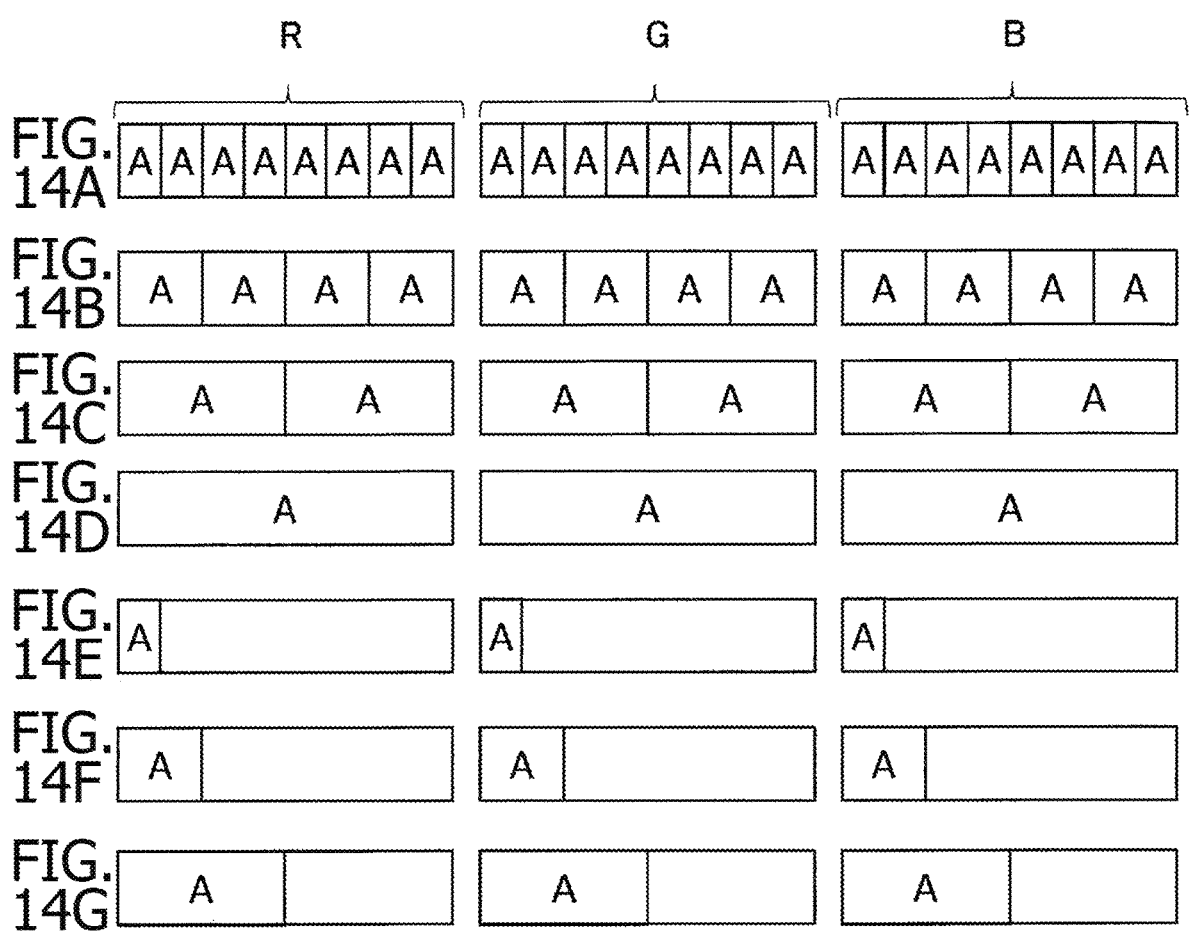

IMAGE DATA TRANSMISSION METHOD, CONTENT PROCESSING APPARATUS, HEAD-MOUNTED DISPLAY, RELAY APPARATUS AND CONTENT PROCESSING SYSTEM

CROSS REFERENCE TO RELATED APPLICATIONS

This application claims the benefit of Japanese Priority Patent Application JP 2019-068189 filed Mar. 29, 2019 and Japanese Priority Patent Application JP 2019-185341 filed Oct. 8, 2019, the entire contents of each of which are incorporated herein by reference.

BACKGROUND

The present disclosure relates to an image data transmission method, a content processing apparatus, a head-mounted display, a relay apparatus, and a content processing system utilized for image display.

A technology for capturing a moving picture and processing the moving picture on the real time basis to obtain some information or displaying the moving picture is utilized in various fields. For example, if a camera for imaging an actual space on a front face of a head-mounted display of the shielded type is provided and a captured image of the camera is displayed as it is, then its user can perform an action while checking a surrounding situation. Further, if a virtual object is displayed in a merged relation with a captured image of the camera, then augmented reality (AR) or mixed reality (MR) can be implemented.

SUMMARY

In a technology of merging an image generated separately such as a virtual object with a captured image and displaying the resulting image on the real time basis, as a higher-quality image expression is pursued, the amount of data to be transmitted after imaging and before displaying and the load of various processes such as image analysis increase. As a result, the power consumption, utilized memory capacity, and resource consumption such as central processing unit (CPU) time increase, and displacement in time occurs between a motion of a user and a motion on the display. The user thereby feels uncomfortable and, in some cases, poor health such as video sickness can be caused.

Further, according to a mode in which an image is generated by an external apparatus and transmitted to a head-mounted display, while a high-quality image can be displayed without increasing the load to the head-mounted display itself, in order to transmit data of a large size, wired communication is may be required and the range of movement of the user is restricted.

The present disclosure has been made in view of such a subject as described above, and it is desirable to provide, in a technology of displaying a merged image including a captured image in a moving picture, a technology capable of displaying a high-quality image while the delay time from imaging to displaying or the resource consumption amount is suppressed. It is also desirable to provide an image displaying technology capable of providing compatibility with various communication methods between a head-mounted display and an external apparatus.

According to an embodiment of the present disclosure, there is provided an image data transmission method including, by an image generation apparatus, generating an image to be merged with a display image and data of an α value representative of a transparency of a pixel of the image to be merged, generating data for merging representing the image to be merged and the data of the α value on one image plane, and transmitting the data for merging to an apparatus that generates the display image.

According to another embodiment of the present disclosure, there is provided a content processing apparatus including: an image drawing unit configured to generate an image to be merged with a display image; a merge information integration unit configured to generate data for merging that represents, on one image plane, the image to be merged and data of an α value representative of a transparency of a pixel of the image to be merged; and a communication unit configured to output the data for merging.

According to a further embodiment of the present disclosure, there is provided a head-mounted display including: a camera configured to image an actual space; an image processing integrated circuit configured to receive, from an external apparatus, data for merging that represents an image to be merged with a display image and data of an α value representative of a transparency of a pixel of the image to be merged on one image plane and merge the image to be merged with a captured image by the camera on a basis of the α value to generate a display image; and a display panel configured to output the display image.

According to a still further embodiment of the present disclosure, there is provided a relay apparatus including a data separation unit configured to separate data for merging that represents an image to be merged with a display image and data of an α value representative of a transparency of a pixel of the image to be merged on one image plane into the image to be merged and the data of the α value, a compression encoding unit configured to compression-encode the image to be merged and the data of the α value by methods different from each other, and a communication unit configured to acquire the data for merging from an apparatus that generates a display image and transmit the compression-encoded data to the apparatus that generates the display image.

According to a yet further embodiment of the present disclosure, there is provided a content processing system including a display apparatus and a content processing apparatus configured to generate an image to be displayed on the display apparatus. The content processing apparatus includes a merge data generation unit configured to generate data for merging that represents an image to be merged with a display image and data of an α value representative of a transparency of a pixel of the image to be merged on one image plane, and a communication unit that outputs the data for merging. The display apparatus includes a camera configured to image an actual space, an image processing integrated circuit configured to merge the image to be merged with a captured image by the camera on a basis of the α value of the data for merging to generate a display image, and a display panel configured to output the display image.

It is to be noted that also an arbitrary combination of the constituent elements described above and conversions of representations of the embodiments of the present disclosure between a method, an apparatus, a system, a computer program, a data structure, a recording medium, and so forth are effective as modes of the present disclosure.

According to the embodiments of the present disclosure, the technology of displaying a merged image including a captured image in a moving picture makes it possible to display a high-quality image while the delay time from imaging to displaying or the resource consumption amount is suppressed. Further, the technology makes it possible to be ready for various communication methods between a head-mounted display and an external apparatus.

The above and other objects, features and advantages of the present disclosure will become apparent from the following description and the appended claims, taken in conjunction with the accompanying drawings in which like parts or elements are denoted by like reference symbols.

BRIEF DESCRIPTION OF THE DRAWINGS

FIGS. 6A and 6B are views illustrating the substance of data to be transmitted from the content processing apparatus such that the image processing integrated circuit merges images;

FIGS. 14A to 14G are views exemplifying a data structure of a pixel value of an α image integrated with a graphics image by the content processing apparatus;

DETAILED DESCRIPTION OF THE PREFERRED EMBODIMENT

Figure 1:
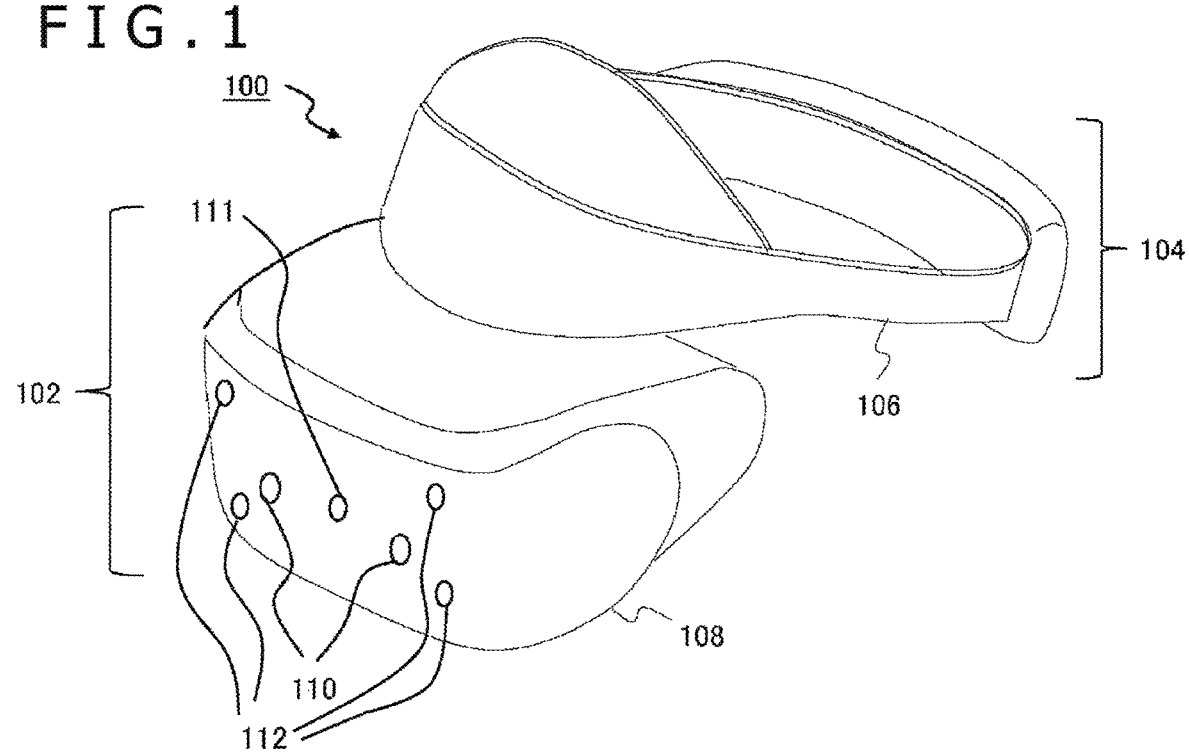
FIG. 1 is a view depicting an example of an appearance of a head-mounted display of an embodiment of the present disclosure.

FIG. 1 depicts an example of an appearance of a head-mounted display 100. In the present example, the head-mounted display 100 includes an outputting mechanism unit 102 and a mounting mechanism unit 104. The mounting mechanism unit 104 includes a mounting band 106 that goes, when the mounting mechanism unit 104 is worn by a user, around the head of the user to implement fixation of the head-mounted display 100. The outputting mechanism unit 102 includes a housing 108 shaped such that it covers the left and right eyes of the user in a state in which the user wears the head-mounted display 100, and includes, in the inside of the housing 108, a display panel that faces the eyes of the user when the head-mounted display 100 is worn by the user.

The housing 108 further includes, in the inside thereof, eyepieces that are positioned between the display panel and the eyes of the user when the head-mounted display 100 is worn and enlarges an image to be viewed by the user. The head-mounted display 100 may further include speakers or earphones at positions corresponding to the ears of the user when the head-mounted display 100 is worn. Further, the head-mounted display 100 may have built-in motion sensors such that a translational motion or a rotational motion and eventually a position or a posture at each time of the head of the user wearing the head-mounted display 100 are detected.

The head-mounted display 100 further includes a stereo camera 110 on a front face of the housing 108, a monocular camera 111 of a wide viewing angle at a middle portion of the front face, and four cameras 112 of a wide viewing angle at four left upper, right upper, left lower, and right lower corners of the front face. The head-mounted display 100 captures a moving picture of an actual space in a direction corresponding to an orientation of the face of the user. In the present embodiment, a mode is provided by which an image captured by the stereo camera 110 is displayed immediately such that a manner of the actual space in a direction in which the user is directed is displayed as it is. Such a mode as just described is hereinafter referred to as "see-through mode." During a period during which an image of content is not displayed, the head-mounted display 100 basically takes the see-through mode.

The head-mounted display 100 automatically transits to and takes the see-through mode, and therefore, before starting, after ending, or upon interruption of content or in a like case, the user can confirm a surrounding situation without removing the head-mounted display 100. The transition timing to the see-through mode may otherwise be a timing when the user explicitly performs a transition operation or the like. This makes it possible for the user to perform suitable operation such as temporary switching, even during appreciation of content, of the display to that of an image of the actual space at an arbitrary timing and finding and picking up a controller.

At least one of captured images by the stereo camera 110, the monocular camera 111, and the four cameras 112 can be utilized also as an image of content. For example, if a virtual object is merged with the captured image in such a position, a posture, and a motion as those corresponding to the reflected actual space and displayed, then AR or MR can be implemented. In this manner, a position, a posture, and a motion of an object to be drawn can be determined using a result of analysis of a captured image irrespective of whether or not the captured image is to be included in the display.

For example, stereo matching may be performed for the captured image to extract corresponding points such that a distance to an imaging target is acquired in accordance with the principle of triangulation. As an alternative, the position or the posture of the head-mounted display 100 and eventually of the head of the user with respect to a surrounding space may be acquired by simultaneous localization and mapping (SLAM). Also, object recognition, object depth measurement, and so forth can be performed. By these processes, a virtual world can be drawn and displayed in a field of vision corresponding to the position of the visual point or the gaze direction of the user.

It is to be noted that the actual shape of the head-mounted display 100 of the present embodiment is not limited to that depicted in FIG. 1 if it includes cameras that capture an actual space in a field of vision corresponding to the position or the direction of the face of the user. Further, if an image of the field of vision of the left eye and an image of the field of vision of the right eye are artificially generated in the see-through mode, then also it is possible to use a monocular camera in place of the stereo camera 110.

Figure 2:
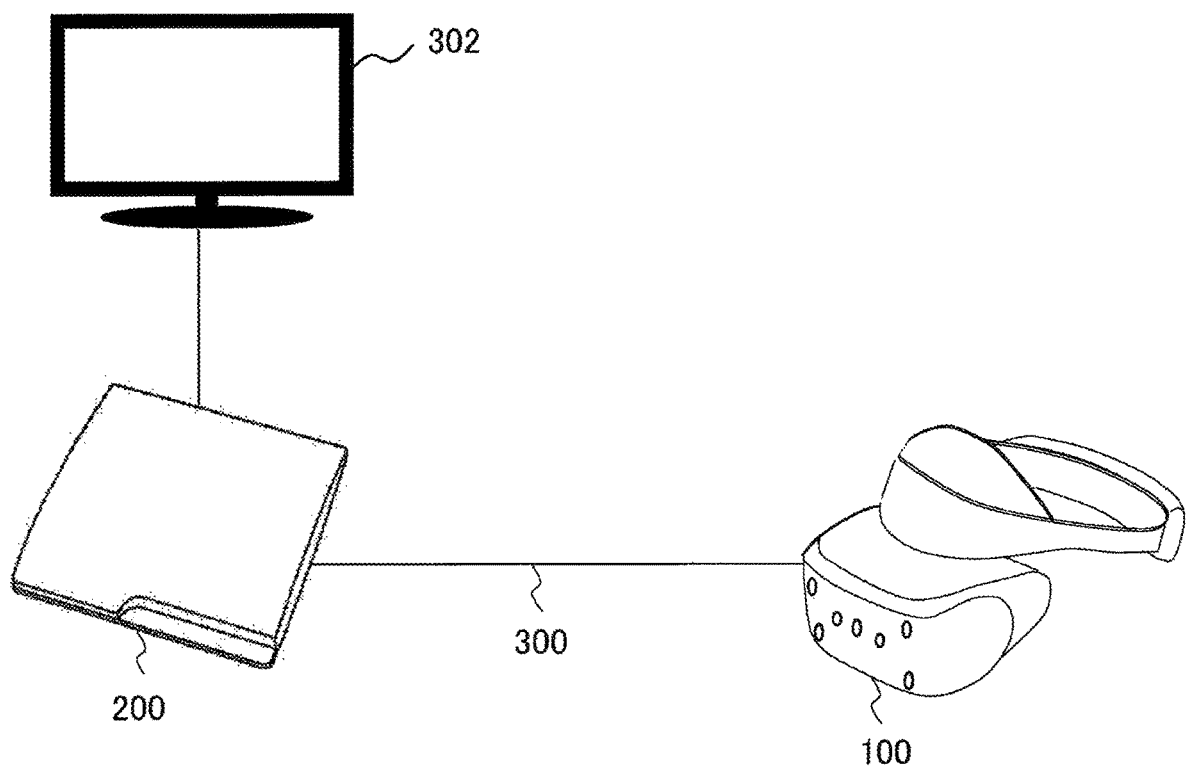
FIG. 2 is a view depicting an example of a configuration of a content processing system of the present embodiment.

FIG. 2 depicts an example of a configuration of a content processing system according to the present embodiment. The head-mounted display 100 is connected to a content processing apparatus 200 by an interface 300 for wireless communication or for connecting a peripheral apparatus such as universal serial bus (USB) Type-C. A flat panel display 302 is connected to the content processing apparatus 200. The content processing apparatus 200 may be further connected to a server through a network. In this case, the server may provide the content processing apparatus 200 with an online application such as a game in which a plurality of users can participate through the network.

Basically, the content processing apparatus 200 processes a program of content and generates a display image and transmits it to the head-mounted display 100 or the flat panel display 302. In a certain mode, the content processing apparatus 200 specifies a position of a visual point or a direction of gaze of a user who wears the head-mounted display 100 on the basis of the position and the posture of the head of the user and generates a display image of a corresponding field of vision at a predetermined rate.

The head-mounted display 100 receives data of the display image and displays the data as an image of the content. Here, a purpose of displaying an image is not restricted specifically. For example, the content processing apparatus 200 may generate a virtual world, which is a stage of a game, as a display image while an electronic game is being progressed or may display a still image or a moving image for the purpose of appreciation or information provision irrespective of whether the image indicates a virtual world or an actual world.

It is to be noted that a distance between the content processing apparatus 200 and the head-mounted display 100 or a communication method of the interface 300 is not restricted specifically. The content processing apparatus 200 may be a game device owned by an individual, a server of an enterprise that provides various delivery services of a cloud game or the like, or an in-home server that transmits data to an arbitrary terminal. Accordingly, the communication between the content processing apparatus 200 and the head-mounted display 100 may be implemented not only by such technique of the examples described above but also through an arbitrary network or an arbitrary access point such as a public network like the Internet, a local area network (LAN), a mobile phone carrier network, a Wi-Fi spot in a town, or a Wi-Fi access point at home.

Figure 3:
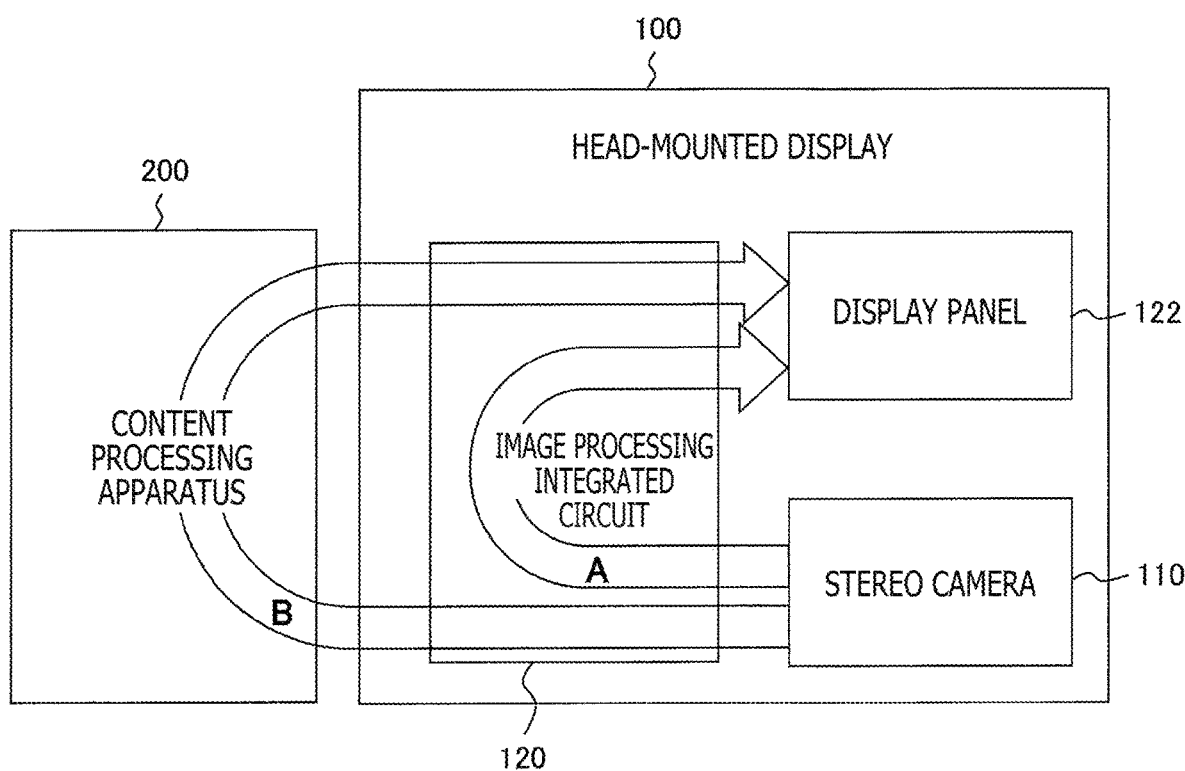
FIG. 3 is a view schematically depicting a path of data in the content processing system.

FIG. 3 schematically depicts a path of data in the content processing system of the present embodiment. The head-mounted display 100 includes the stereo camera 110 and a display panel 122 as described hereinabove. However, the camera is not limited to the stereo camera 110 but may be any one or a combination of the monocular camera 111 and the four cameras 112. This similarly applies also to the following description. The display panel 122 is a panel having a general displaying mechanism such as a liquid crystal display or an organic electroluminescence (EL) display and displays an image in front of the eyes of the user who wears the head-mounted display 100. Further, the head-mounted display 100 includes an image processing integrated circuit 120 in the inside thereof.

The image processing integrated circuit 120 is, for example, a system-on-chip in which various function modules including a CPU are incorporated. It is to be noted that, although the head-mounted display 100 further includes such motion sensors as a gyro sensor, an acceleration sensor, and an angular acceleration sensor, a main memory such as a dynamic random access memory (DRAM), an audio circuit for generating sound to be heard by the user, a peripheral apparatus interface circuit for connecting a peripheral apparatus, and so forth, illustration of them is omitted.

In order to implement AR or MR with a head-mounted display of the shielded type, generally a captured image by the stereo camera 110 or the like is fetched into a main constituent that processes content and is merged with a virtual object by the main constituent to generate a display image. In the system depicted, since the main constituent that processes content is the content processing apparatus 200, an image captured by the stereo camera 110 is transmitted once into the content processing apparatus 200 via the image processing integrated circuit 120 as indicated by an arrow mark B.

Then, the image is processed such as merged with a virtual object and returned to the head-mounted display 100, where it is displayed on the display panel 122. On the other hand, in the present embodiment, a path of data for a captured image is provided as indicated by an arrow mark A. For example, in the see-through mode, an image captured by the stereo camera 110 is suitably processed by the image processing integrated circuit 120 and is displayed as it is on the display panel 122. At this time, the image processing integrated circuit 120 carries out only a process for correcting the captured image so as to have a format suitable for display.

As an alternative, an image generated by the content processing apparatus 200 and a captured image are merged with each other by the image processing integrated circuit 120 and are displayed on the display panel 122. This makes it sufficient to transmit, from the head-mounted display 100 to the content processing apparatus 200, only information relating to an actual space acquired from the captured image in place of data of the captured image. Further, it becomes sufficient if only data of the images to be merged are transmitted from the content processing apparatus 200 to the head-mounted display 100.

In the case where the content processing apparatus 200 uses the information relating to the actual space acquired from the captured image, more specifically, the information relating to the actual space acquired by analyzing the captured image, to generate the image to be merged, the content processing apparatus 200 transmits following pieces of information along with the image to be merged: information indicating the information relating to the actual space acquired from the captured image at what point of time is used, information indicating when the merging is to be performed, and information indicating a permissible delay time of the merging. This enables the image processing integrated circuit 120 and the content processing apparatus 200 to appropriately control the timing to perform the merging with the captured image.

According to the path of the arrow mark A, the transmission path of data is reduced significantly in comparison with that of the arrow mark B. Further, the size of data to be transmitted between the head-mounted display 100 and the content processing apparatus 200 can be reduced as described above. As a result, the period of time after imaging till displaying of an image and the power consumption for transmission can be reduced.

Figure 4:
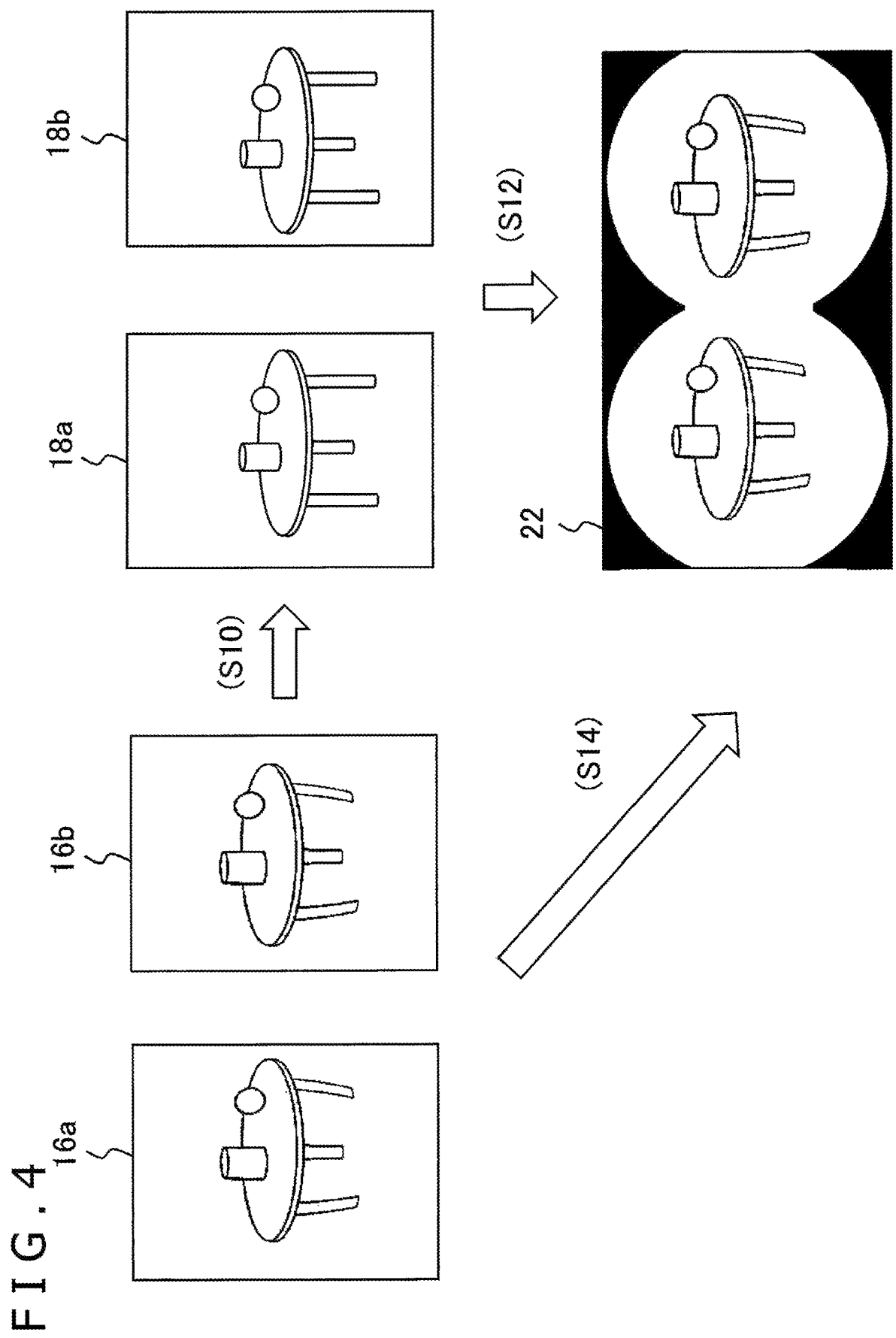
FIG. 4 is a view illustrating a process by an image processing integrated circuit according to the present embodiment for generating a display image from a captured image.

FIG. 4 is a view illustrating a process by the image processing integrated circuit 120 for generating a display image from a captured image. It is assumed that, in an actual space, a table on which an article is placed exists in front of the user. The stereo camera 110 images the table to acquire a captured image 16a of a left visual point and a captured image 16b of a right visual point. Because of a distance between the visual points of the stereo camera 110, the captured images 16a and 16b indicate a parallax between figures of the same imaging target.

Further, due to lenses of the camera, distortion aberration occurs in the figures of the imaging target. Generally, such lens distortion is corrected to generate an image 18a of the left visual point and an image 18b of the right visual point that are free from distortion (S10). Here, if position coordinates (x, y) of a pixel in the original captured images 16a and 16b are corrected to position coordinates (x+Δx, y+Δy) in the images 18a and 18b after the correction, then a displacement vector (Δx, Δy) can be represented by the following general formula.

[Math. 1]

$$\Delta x = (k_1 r^2 + k_2 r^4 + k_3 r^6 + \ldots)(x - c_x)$$

$$\Delta y = (k_1 r^2 + k_2 r^4 + k_3 r^6 + \ldots)(y - c_y) \quad \text{(formula 1)}$$

Here, r is a distance from an optical axis of a lens to a target pixel on an image plane, and ($c_x$, $c_y$) is a position of the optical axis of the lens. Further, $k_1$, $k_2$, $k_3$, . . . are lens distortion coefficients and rely upon design of the lens. An upper limit of the dimension number is not restricted specifically. It is to be noted that the formula to be used for correction of the lens distortion in the present embodiment is not restricted to the formula 1. In a case where an image is displayed on a flat panel display or image analysis is performed, a general image corrected in such a manner as described above is used. On the other hand, in order that the images 18a and 18b free from distortion are viewed on the head-mounted display 100 when they are viewed through the eyepieces, it may be necessary to provide distortion reverse to the distortion due to the eyepieces.

For example, in the case of a lens through which four sides of an image look recessed like a pincushion, an image is distorted to a barrel shape in advance. Accordingly, by distorting the images 18a and 18b free from distortion so as to correspond to the eyepieces and connecting them horizontally in accordance with a size of the display panel 122, a final display image 22 is generated (S12). The relation between figures of an imaging target in left and right regions of the display image 22 and figures of the imaging target in the images 18a and 18b free from distortion before the correction is equivalent to the relation between an image having lens distortion of the camera and an image in which the distortion is corrected.

Accordingly, based on an inverse vector of the displacement vector (Δx, Δy) in the formula 1, a figure having distortion in the display image 22 can be generated. However, naturally a variable relating to the lens is a value of the eyepieces. The image processing integrated circuit 120 in the present embodiment completes removal and addition of distortion taking such two lenses into consideration by single time calculation (S14). In particular, a displacement vector map is generated in advance which represents displacement vectors that indicate to which positions in the display image 22 pixels on the original captured images 16a and 16b are to be displaced by correction on the image plane.

If the displacement vector when distortion due to the lens of the camera is removed is represented by (Δx, Δy) and the displacement vector when distortion is added for the eyepieces is represented by (−Δx', −Δy'), then the displacement vector held at each position by the displacement vector map is (Δx-Δx', Δy-Δy'). It is to be noted that, since the displacement vector merely defines a direction of displacement and a displacement amount of a pixel, if such parameters can be determined in advance, then not only correction arising from lens distortion but also various corrections or combinations can be implemented readily by a similar configuration.

When a display image 22 is to be generated, the displacement vector map is referred to move pixels at the positions of the captured images 16a and 16b by amounts corresponding to displacement vectors. It is to be noted that the captured images 16a and 16b may be corrected to generate display images for the left and right eyes and are connected to each other later to generate a display image 22. Although the captured images 16a and 16b and the display image 22 have a displacement corresponding to distortion therebetween, since they do not have much difference in position or shape in which a figure is represented, in parallel to acquisition of pixel values of the captured image in order from the top row of the image plane, it is possible to perform correction of the acquired pixel values. Then, by subjecting the pixel values to processing at a succeeding stage in parallel to the correction process in order from the top row, display with small delay can be implemented.

Figure 5:
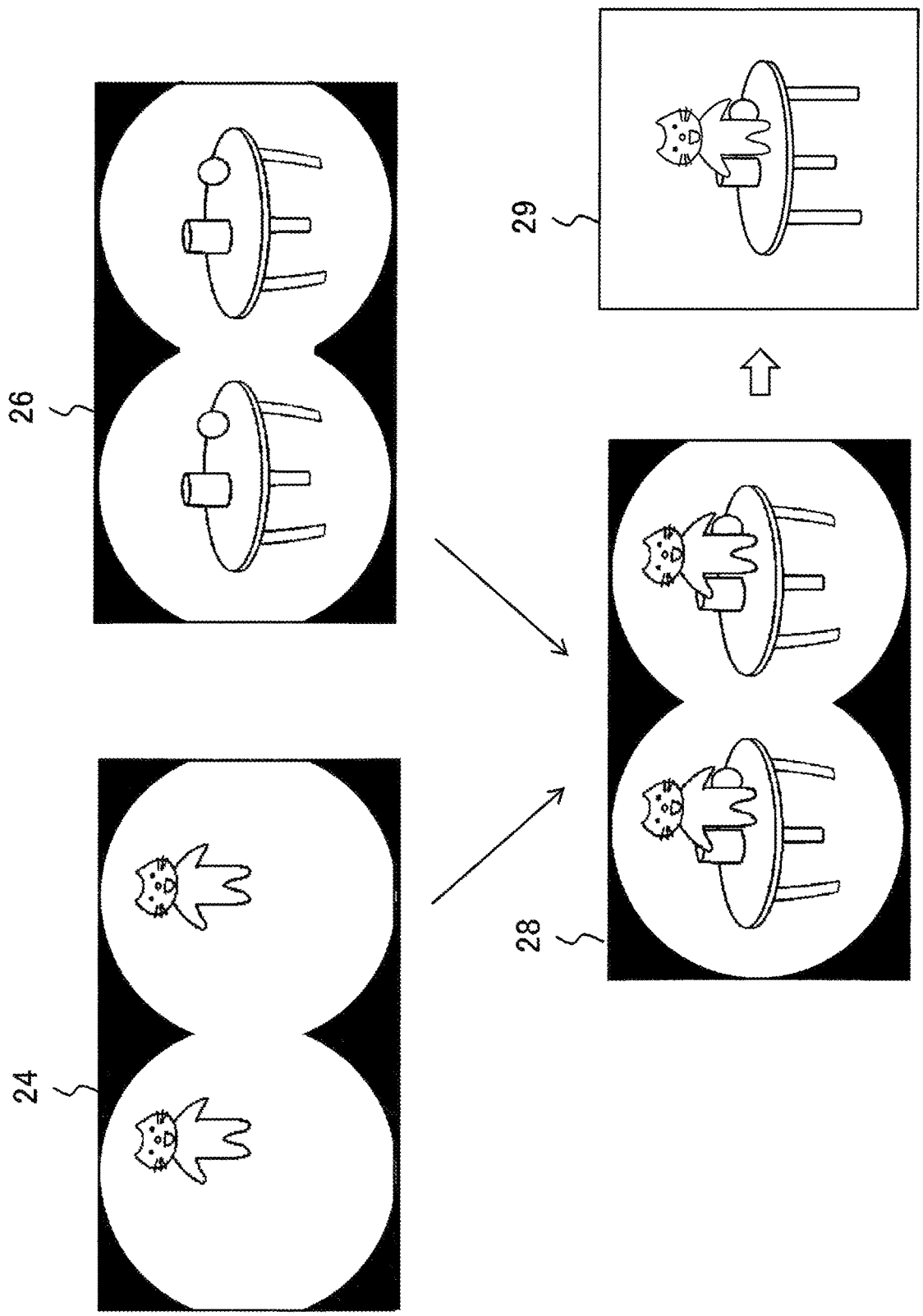
FIG. 5 is a view illustrating a process by the image processing integrated circuit for merging a virtual object transmitted from the content processing apparatus with a captured image to generate a display image.

FIG. 5 is a view illustrating a process by the image processing integrated circuit 120 for merging a virtual object transmitted from the content processing apparatus 200 with a captured image to generate a display image. An image 26 at the right upper portion of FIG. 5 depicts an image obtained by correcting a captured image as described hereinabove with reference to FIG. 4. However, in this mode, the image is not displayed as it is, but it is merged with the image 24 of the virtual object transmitted from the content processing apparatus 200 to acquire a final display image 28. In the example depicted, an object of a cat is merged.

As depicted in FIG. 5, the content processing apparatus 200 generates the image 24 in which the object of a cat is drawn at a position appropriate for merging with a captured image. At this time, images having a parallax for the left eye and the right eye are generated first, and distortion based on the eyepieces of the head-mounted display 100 is provided to the images similarly to the distortion described hereinabove with reference to S12 of FIG. 4. The content processing apparatus 200 connects the left and right images to which the distortion has been provided to each other to form the image 24 and transmits the image 24 to the head-mounted display 100.

The image processing integrated circuit 120 of the head-mounted display 100 fits the object of a cat in the image 24 transmitted from the content processing apparatus 200 into the image 26 corrected from the captured image to merge them to generate a display image 28. By drawing the object at the appropriate position in the image 24, for example, such an image that the object of a cat stands on a table that is a real object is displayed. When the user views the display image 28 through the eyepieces, a figure like an image 29 is viewed stereoscopically by the user.

It is to be noted that the generation source or the transmission source of data of an image to be merged, for example, the image 24 of the virtual object, is not limited to the content processing apparatus 200. For example, the generation source or the transmission source may be a server connected to the content processing apparatus 200 or the head-mounted display 100 through a network or may be a module that is built in the head-mounted display 100 and is different from the image processing integrated circuit 120. Also, it is possible to grasp such apparatuses including the content processing apparatus 200 as the "image generation apparatuses." Further, an apparatus that carries out a merge process to generate a display image may be provided separately from the head-mounted display 100.

FIGS. 6A and 6B are views illustrating the substance of data transmitted from the content processing apparatus 200 such that the image processing integrated circuit 120 merges an image. FIG. 6A represents data including an image (hereinafter referred to as graphics image) 50, which represents a virtual object to be merged in a display format and an $\alpha$ image 52 that represents an $\alpha$ value representative of transparency of the graphics image 50 on the image plane. Here, the $\alpha$ value is a general parameter that represents transparency when it is 0, represents opacity when it is 1, and represents translucency when it is an intermediate value, the degree of the translucency corresponding to the value.

In a case where only the object of a cat is to be merged translucently in the example depicted, an $\alpha$ image in which the $\alpha$ values in the region of the object of a cat are set to 1 and the $\alpha$ values in the other region are set to 0 is generated. The image processing integrated circuit 120 merges the image corrected from the captured image and the graphics image 50 transmitted from the content processing apparatus 200 with each other by the following arithmetic operation to generate a display image.

$$F_{out} = (1-\alpha)F_i + \alpha F_o$$

Here, $F_i$ and $F_o$ are pixel values at the same position in the corrected captured image and the graphics image 50, respectively; $\alpha$ is an $\alpha$ value at the same position in the $\alpha$ image; and $F_{out}$ is a pixel value at the same position in the display image. It is to be noted that actually the arithmetic operation described above is carried out for each of the images of three channels of red, green, and blue.

FIG. 6B depicts data of an image 54 in which any other region than the virtual object to be merged in the graphics image is filled with a predetermined color such as green. In this case, the image processing integrated circuit 120 determines only the other region than the region where the pixel value represents the predetermined color as a merge target region in the image 54 and replaces the pixels in the merge target region with the pixels in the captured image. As a result, a display image is generated in which, in the example depicted, only the pixels in the region of the object of a cat are replaced with the pixels of the captured image while the captured image remains in the other region. Such a merging method as just described is known as chroma keying.

The content processing apparatus 200 acquires information relating to the position or the posture of an imaging target in the captured image from the head-mounted display 100 and generates a graphics image by drawing a virtual object on the basis of the positional relation with the imaging target. Simultaneously, an $\alpha$ image 52 is generated or the region other than the virtual object is filled with a predetermined color to generate information used for a merge process (hereinafter referred to as "merge information.") By transmitting them to the head-mounted display 100 so as to be merged, the amount of data to be transmitted as a whole can be reduced.

Figure 7A:
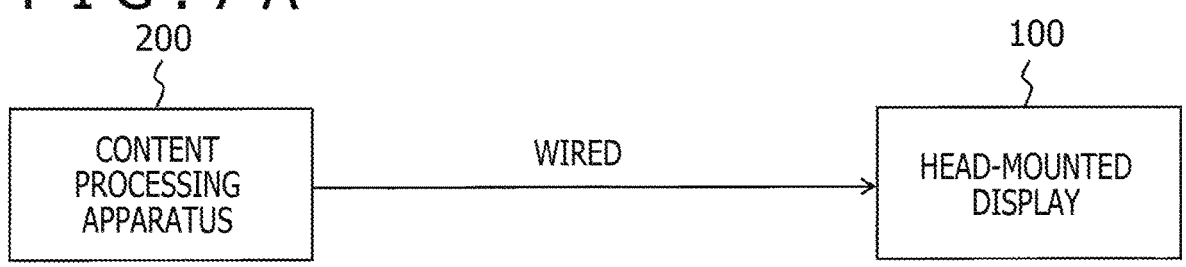
FIGS. 7A and 7B are block diagrams depicting variations of a system configuration for transmitting data for merging from the content processing apparatus to the head-mounted display.
Figure 7B:
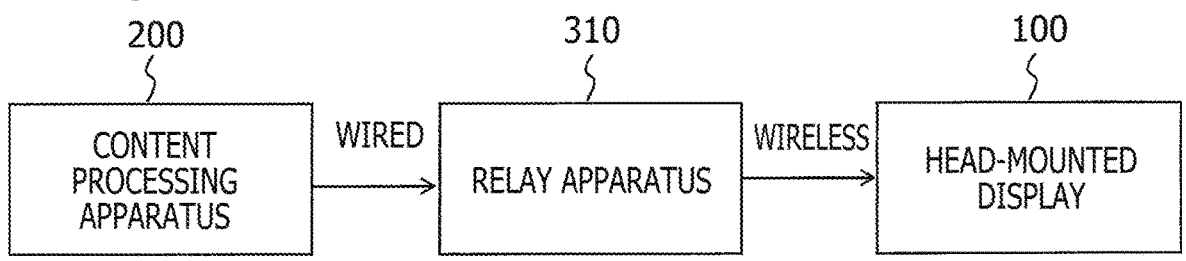

FIGS. 7A and 7B depict variations of a system configuration for transmitting data for merging from the content processing apparatus 200 to the head-mounted display 100. FIG. 7A depicts a case in which the content processing apparatus 200 and the head-mounted display 100 are connected to each other by wired communication in accordance with a standard such as DisplayPort. FIG. 7B depicts a case in which a relay apparatus 310 is provided between the content processing apparatus 200 and the head-mounted display 100 such that the content processing apparatus 200 and the relay apparatus 310 are connected to each other by wired communication while the relay apparatus 310 and the head-mounted display 100 are connected to each other by wireless communication in accordance with Wi-Fi (registered trademark).

In the case of the configuration of FIG. 7A, since a cable is connected to the head-mounted display 100, if the content processing apparatus 200 is of the installed type, then while the movement of the user can be obstructed, a comparatively high bitrate can be assured. In the case of the configuration of FIG. 7B, in order to transmit data ready for a frame rate of wireless communication, although it may be necessary to increase the compression ratio of data from that in the case of wired communication, the range of movement of the user can be increased. The present embodiment is made compatible with both of such system configurations as described above such that optimization according to a communication environment or a demanded processing performance can be achieved.

Figure 8:
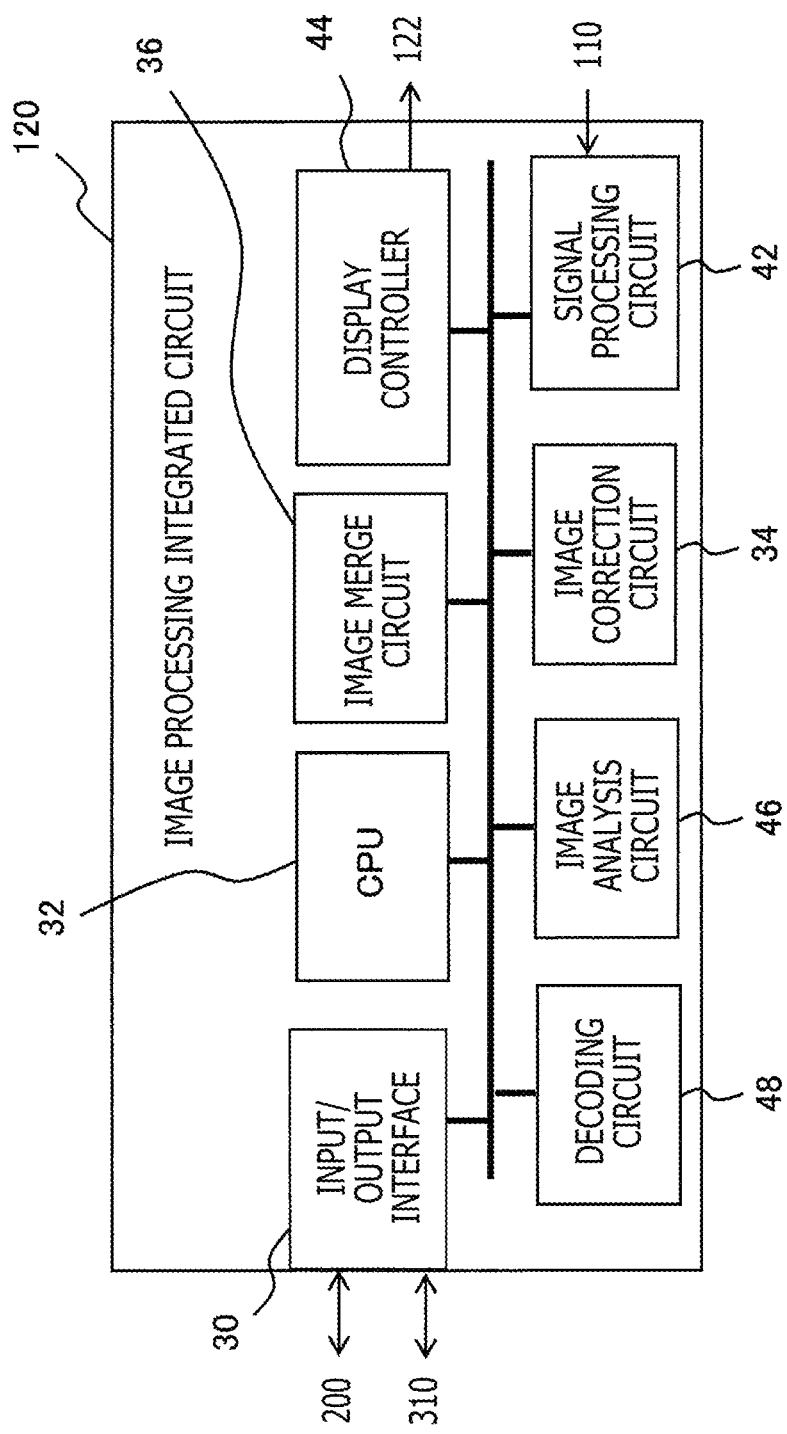
FIG. 8 is a block diagram depicting a circuit configuration of the image processing integrated circuit.

FIG. 8 depicts a circuit configuration of the image processing integrated circuit 120 in the present embodiment. However, FIG. 8 depicts only the configuration relating to the present embodiment but omits the other matters. The image processing integrated circuit 120 includes an input/output interface 30, a CPU 32, a signal processing circuit 42, an image correction circuit 34, an image analysis circuit 46, a decoding circuit 48, an image merge circuit 36, and a display controller 44.

The input/output interface 30 establishes communication with the content processing apparatus 200 by wired communication and with the relay apparatus 310 by wireless communication to implement transmission and reception of data to and from one of the content processing apparatus 200 and the relay apparatus 310. In the present embodiment, the input/output interface 30 transmits an analysis result of an image, measurement values of the motion sensors, and so forth to the content processing apparatus 200. Also, at this time, the relay apparatus 310 may be used for relaying. Further, the input/output interface 30 receives data of a graphics image and merge information generated by the content processing apparatus 200 in response to the transmission from the content processing apparatus 200 or the relay apparatus 310.

The CPU 32 is a main processor that processes signals such as an image signal and a sensor signal, commands, and data and outputs a result of the processes and controls the other circuits. The signal processing circuit 42 acquires data of a captured image from the left and right image sensors of the stereo camera 110 at a predetermined frame rate and carries out suitable processes such as a demosaic process for the data. The signal processing circuit 42 supplies the data in an order of pixel rows in which pixel values are determined to the image correction circuit 34 and the image analysis circuit 46.

The image correction circuit 34 corrects pixels in a captured image by displacing each pixel by an amount corresponding to a displacement vector as described above. The target for setting a displacement vector in the displacement vector map may be all pixels in the captured image plane or may be only discrete pixels at predetermined distances. In the latter case, the image correction circuit 34 first determines a displacement destination in regard to pixels to which a displacement vector is set and determines a displacement destination of the remaining pixels by interpolation on the basis of the positional relations to the pixels.

In a case where chromatic aberration is to be corrected, since the displacement vector differs among the primary colors of red, green, and blue, three displacement vector maps are prepared. Further, for a pixel whose value is not determined by such displacement of the pixel in the display image, the image correction circuit 34 determines a pixel value by suitable interpolation of pixel values of surrounding pixels. The image correction circuit 34 successively places pixel values determined in such a manner as described above into a buffer memory. Then, in the see-through mode, the pixel values are determined and sequentially the data are outputted in order from the top row of the image plane to the display controller 44. Upon image merging, the data are successively outputted to the image merge circuit 36 in a similar manner.

The image analysis circuit 46 acquires predetermined information by analyzing a captured image. For example, the image analysis circuit 46 determines a distance to an imaging target by stereo matching using the left and right captured images and generates a depth map in which the distance is represented as a pixel value on the image plane. The position or the posture of the head-mounted display 100 may be acquired by SLAM. Further, it can be recognized by those skilled in the art that various contents are available as the substance of image analysis. The image analysis circuit 46 sequentially transmits the acquired information to the content processing apparatus 200 through the input/output interface 30.

The decoding circuit 48 decodes and decompresses data for merging received by the input/output interface 30. Since the communication band changes depending upon whether communication with a different apparatus is performed by wired communication or wireless communication as described above, in the present embodiment, the structure and the compression method of data for merging are switched in response to the used communication. Accordingly, the decoding circuit 48 suitably selects a method suitable for the received data and performs decoding and decompression by the method. The decoding circuit 48 sequentially supplies the decoded and decompressed data to the image merge circuit 36.

As depicted in FIG. 5, the image merge circuit 36 merges a captured image supplied from the image correction circuit 34 and a graphics image supplied from the decoding circuit 48 with each other to generate a display image. For the merging, any of alpha blend and chroma keying may be adopted as described above. In a case where data of an image in which a graphics image and an α image are integrated is transmitted from the content processing apparatus 200, the image merge circuit 36 separates and reproduces the graphics image and the α image and then carries out alpha blend.

In a case where data of a graphics image and an α image reduced in a predetermined direction are transmitted from the relay apparatus 310, the image merge circuit 36 enlarges the images in the predetermined direction to restore the images and carries out alpha blend. It is to be noted that the image correction circuit 34 carries out chromatic aberration correction for the display image after the merging as occasion demands. Then, the image merge circuit 36 or the image correction circuit 34 determines pixel values and sequentially outputs data to the display controller 44 in order from the top row of the image plane.

Figure 9:
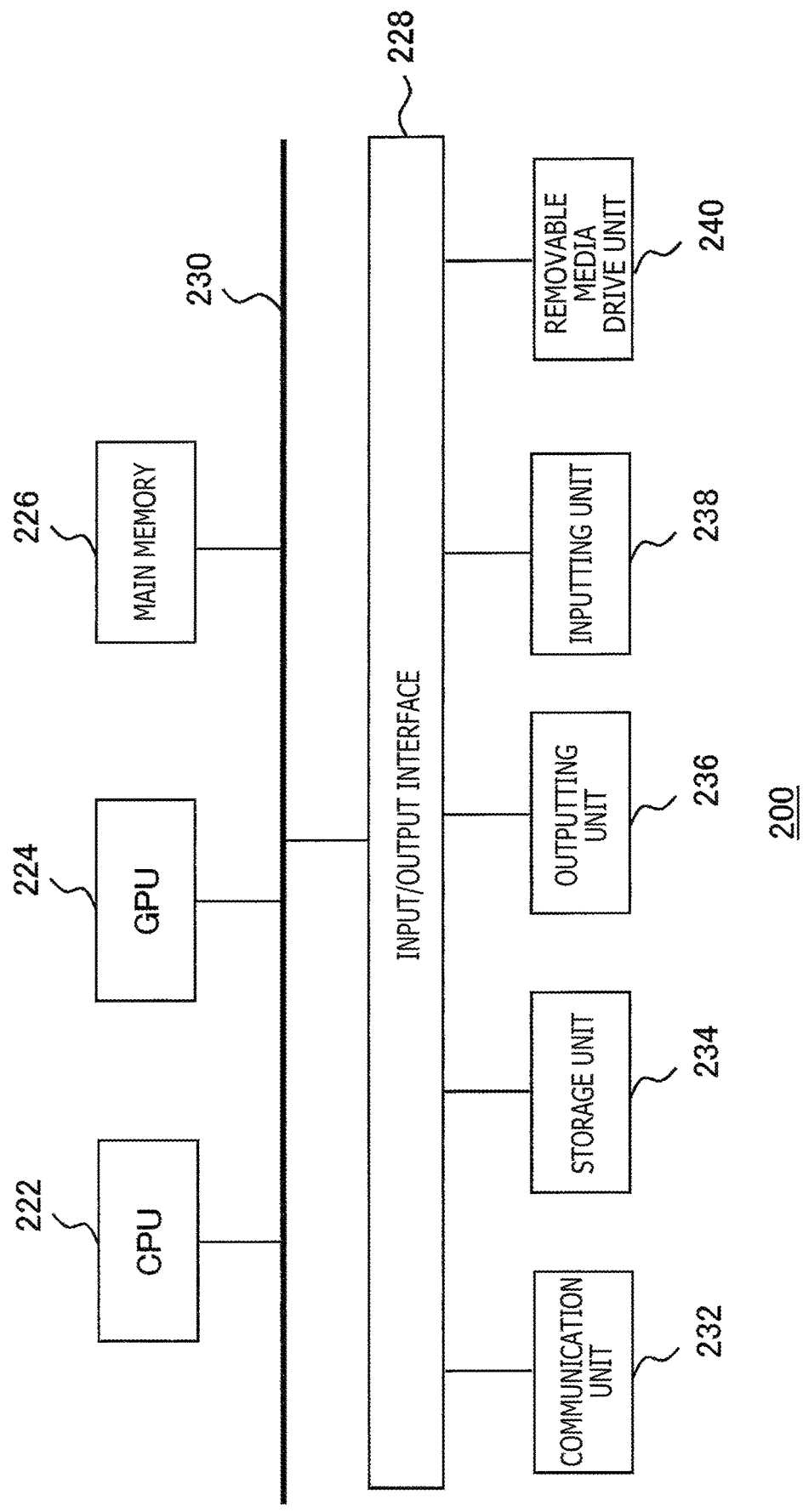
FIG. 9 is a block diagram depicting an internal circuit configuration of the content processing apparatus.

FIG. 9 depicts an internal circuit configuration of the content processing apparatus 200. The content processing apparatus 200 includes a CPU 222, a graphics processing unit (GPU) 224, and a main memory 226. The components mentioned are connected to each other through a bus 230. To the bus 230, an input/output interface 228 is connected further.

To the input/output interface 228, a communication unit 232, a storage unit 234, an outputting unit 236, an inputting unit 238, and a removable media drive unit 240 are connected. The communication unit 232 includes a peripheral apparatus interface of USB or peripheral component interconnect-express (PCIe) and a network interface to a wired or wireless LAN. The storage unit 234 includes a hard disk drive, a nonvolatile memory, or the like. The outputting unit 236 outputs data to the head-mounted display 100, and the inputting unit 238 receives data from the head-mounted display 100 as an input thereto. The removable media drive unit 240 drives a removable recording medium such as a magnetic disk, an optical disc or a semiconductor memory.

The CPU 222 controls the entire content processing apparatus 200 by executing an operating system stored in the storage unit 234. The CPU 222 further executes various programs read out from the removable recording medium and loaded in the main memory 226 or downloaded through the communication unit 232. The GPU 224 has a function of a geometry engine and a function of a rendering processor, and performs a drawing process in accordance with a drawing command from the CPU 222 and outputs a result of the drawing process to the outputting unit 236. The main memory 226 includes a random access memory (RAM) and stores programs and data to be used for processing.

Figure 10:
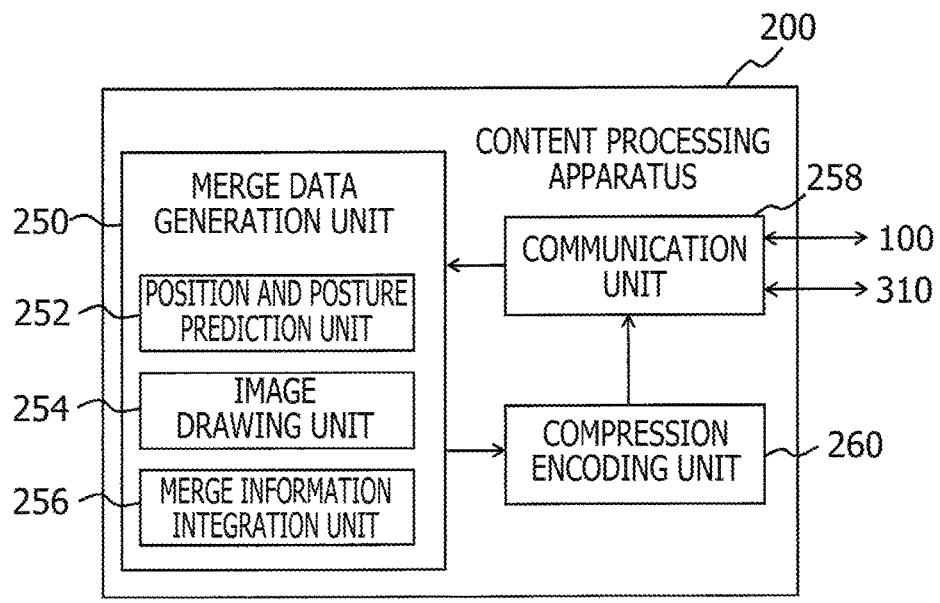
FIG. 10 is a block diagram depicting a configuration of functional blocks of the content processing apparatus.

FIG. 10 depicts a configuration of functional blocks of the content processing apparatus 200 in the present embodiment. The functional blocks depicted in FIG. 10 and in FIGS. 11 and 12 hereinafter described can be implemented, in hardware, by such components as a CPU, a GPU, and various memories and, in software, by a program that is loaded from a recording medium or the like into the memory and demonstrates various functions such as a data inputting function, a data holding function, an image processing function, and a communication function. Accordingly, it can be recognized by those skilled in the art that the functional blocks can be implemented in various forms, for example, only by hardware, only by software, or a combination of them and are not restrictive.

The content processing apparatus 200 includes a communication unit 258 that performs transfer of data to and from the head-mounted display 100 or the relay apparatus 310, a merge data generation unit 250 for generating data for merging, and a compression encoding unit 260 that compresses and encodes the generated data. The communication unit 258 establishes communication by wired communication with the head-mounted display 100 or the relay apparatus 310 and receives an analysis result of a captured image from the head-mounted display 100. The communication unit 258 transmits data for merging generated by the merge data generation unit 250 to the head-mounted display 100 or the relay apparatus 310.

The merge data generation unit 250 includes a position and posture prediction unit 252, an image drawing unit 254, and a merge information integration unit 256. The position and posture prediction unit 252 predicts a position or a posture of an imaging target after every predetermined period of time on the basis of an analysis result of a captured image from the head-mounted display 100. In the present embodiment, since a captured image is processed by the head-mounted display 100 side, display with small delay is possible. On the other hand, where an analysis result of a captured image is transferred between the different apparatuses and the content processing apparatus 200 generates a corresponding graphics image, a fixed period of time may be required.

Therefore, when the graphics image is merged by the head-mounted display 100, a frame of the captured image of the merge destination is a frame later than the frame on which the analysis is based. Therefore, a time difference between the frame used for the image analysis and the frame of the merge destination is calculated in advance, and the position and posture prediction unit 252 predicts a position or a posture of the imaging target at time later by the time difference. Where the head-mounted display 100 merges the graphics image generated on the basis of the prediction result with the captured image, a display image in which the displacement between the graphics image and the captured image is small can be generated.

It is to be noted that the position or the posture of the imaging target may be a relative one to the imaging plane of the stereo camera 110. Accordingly, the information to be used for prediction is not limited to an analysis result of a captured image but may be a measurement value by a motion sensor built in the head-mounted display 100 or may be suitable combination of them. For prediction of a position or a posture of an imaging target, any of general technologies may be adopted.

The image drawing unit 254 generates, on the basis of information of a predicted position or posture of an imaging target, a corresponding graphics image. Since the purpose of image display is not restricted specifically as described hereinabove, the image drawing unit 254 progresses, for example, an electronic game in parallel and draws a virtual object on the basis of a situation of the game progress and the predicted position or posture of the imaging target. However, the process to be carried out by the image drawing unit 254 is not limited to drawing of computer graphics. For example, the image drawing unit 254 may reproduce or cut out a still picture or a moving picture acquired in advance to form an image to be merged. The image drawing unit 254 generates also merge information simultaneously with generation of a graphics image.

The merge information integration unit 256 integrates a graphics image and merge information to generate data for merging. In a case where the merge information is an α image, the merge information integration unit 256 represents the graphics image and the α image in one image plane to integrate them. In the case of chroma keying, to fill a region other than α drawn object with a predetermined color is an integration process of the merge information integration unit 256.

In any case, the merge information integration unit 256 places merge information into a graphics image such that they can be handled as data of an image. The compression encoding unit 260 compression-encodes image data for merging, in which a graphics image and merge information are integrated, by a predetermined method. By implementing transmission from the content processing apparatus 200 to the head-mounted display 100 or the relay apparatus 310 by wired communication, transmission is possible even if reversible compression of a comparatively low compression ratio is used. As reversible compression, Huffman coding or run length coding can be used. Further, also for wired communication, the compression encoding unit 260 may irreversibly compress image data for merging.

Figure 11:
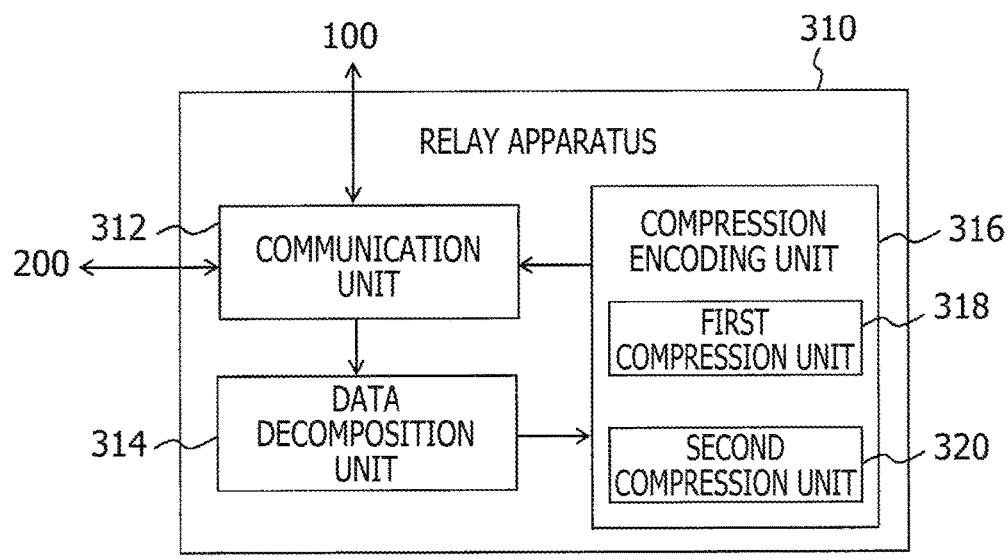
FIG. 11 is a block diagram depicting a configuration of functional blocks of a relay apparatus of the present embodiment.

FIG. 11 depicts a configuration of functional blocks of the relay apparatus 310 in the present embodiment. The relay apparatus 310 includes a communication unit 312 that establishes communication with the content processing apparatus 200 and the head-mounted display 100 and performs data transfer to and from them, a data decomposition unit 314 that decomposes data for merging transmitted from the content processing apparatus 200 as occasion demands, and a compression encoding unit 316 that appropriately re-compresses the data for merging.

The communication unit 312 establishes communication with the content processing apparatus 200 by wired communication and receives data for merging. This data includes a graphics image and merge information integrated with each other as described above. The communication unit 312 further establishes communication with the head-mounted display 100 by wireless communication and transmits appropriately re-compressed data for merging to the head-mounted display 100.

The data decomposition unit 314 first decodes and decompresses data for merging transmitted from the content processing apparatus 200. Where reversibly compressed data are transmitted from the content processing apparatus 200, an image in which an original graphics image and merge information are integrated is restored. Then, in a case where the merge information is an α image, the data decomposition unit 314 decomposes the integrated image into the graphics image and the α image.

On the other hand, in a case where an image for chroma keying is transmitted, the data decomposition unit 314 can omit the decomposition process. Alternatively, the data decomposition unit 314 may carry out the decomposition process by generating an α image in which, in the image for chroma keying, the pixel value in a region in which an object is drawn is 1 and the pixel value in the other region filled with a predetermined color is 0. In this case, succeeding processes are similar to those in the case where an α image is transmitted.

The compression encoding unit 316 includes a first compression unit 318 and a second compression unit 320. The first compression unit 318 compression-encodes the graphics image from among data decomposed by the data decomposition unit 314 while the second compression unit 320 compression-encodes the α image. This α image may be generated from an image for chroma keying. The first compression unit 318 and the second compression unit 320 use compression encoding methods different from each other. Preferably, the first compression unit 318 carries out irreversible compression whose compression ratio is higher than that of the second compression unit 320, and the second compression unit 320 carries out reversible compression.

The relay apparatus 310 plays a role of releasing the head-mounted display 100 from a communication cable.

Therefore, it may be necessary to compress transmission data as far as possible. However, it is considered that, if an α image is irreversibly compressed similarly to a graphics image, then an error may exist in a contour portion that is the most significant and have a bad influence on a result of merging. Therefore, a graphics image and an α image integrated once and sent out by wired communication are separated from each other and are subjected to individually appropriate encoding processes to reduce the data size as a whole. Consequently, data transmission having reduced delay is implemented also by wireless communication.

It is to be noted that, in a case where an image for chroma keying is transmitted from the content processing apparatus 200 and a corresponding a image is not generated by the data decomposition unit 314, the first compression unit 318 may compression-encode the entire image with a high compression ratio. However, in this case, the image decoded in the head-mounted display 100 may include an error. Consequently, it can be considered that pixel values in a region filled with a predetermined color may vary by a small amount and, upon merging, pixel values of pixels of a captured image may be replaced with the pixel values.

Therefore, the image merge circuit 36 of the head-mounted display 100 provides a width to a pixel value for the criterion of a region that is not to be merged (region in which a pixel value is not to be replaced). For example, if it is assumed that the pixel values of a filling color are (Cr, Cg, Cb) in the order of red, green, and blue, then pixel values within the ranges of (Cr±Δr, Cg±Δg, Cb±Δb) are not merged into the captured image. Here, the margins (Δr, Δg, Δb) to the pixel values are set to optimum values by an experiment or the like. This makes it possible to suppress deterioration of the accuracy of the merge process even if an image for chroma keying is compression-encoded with a comparatively high compression ratio.

Figure 12:
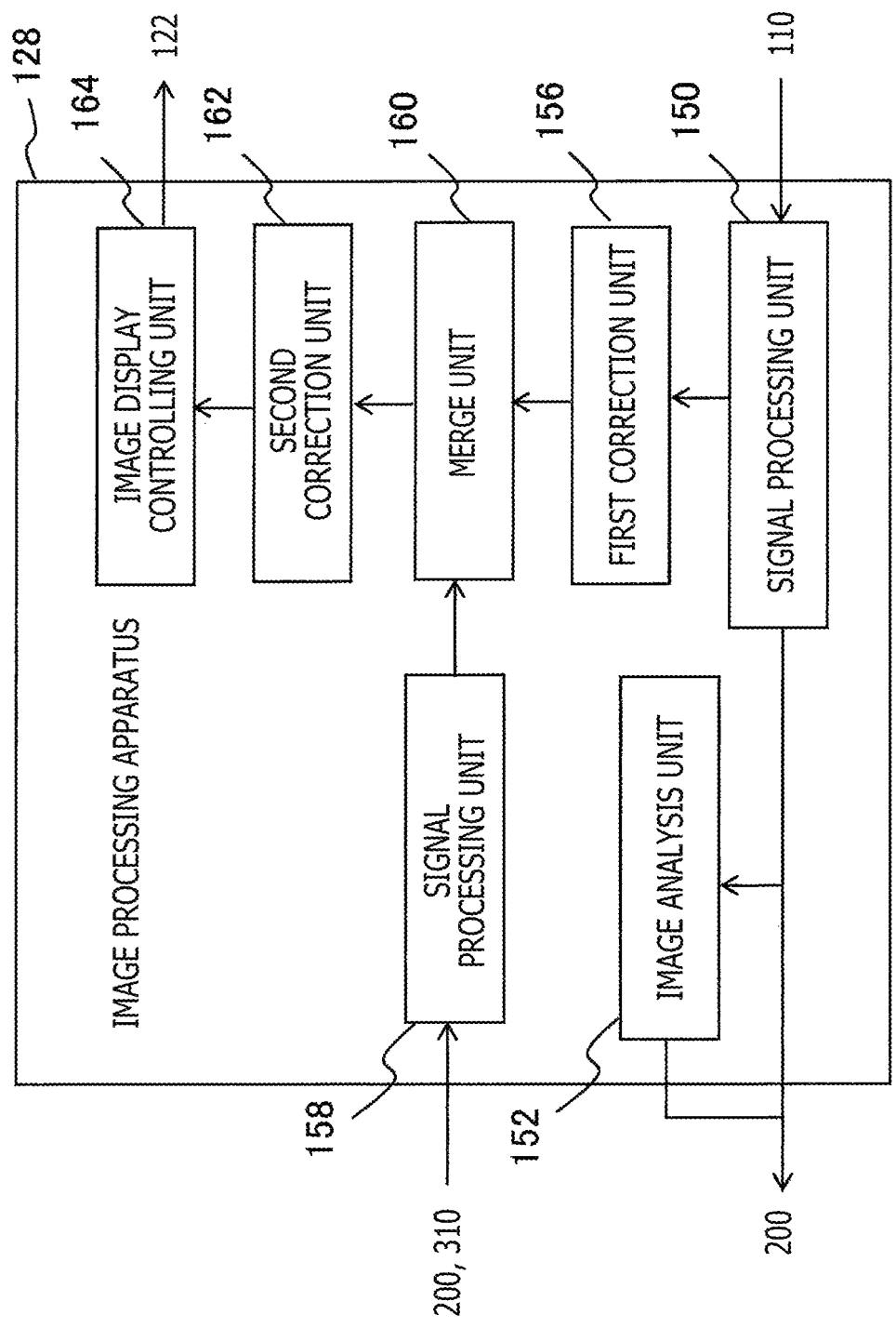
FIG. 12 is a block diagram depicting a configuration of functional blocks of an image processing apparatus built in the head-mounted display.

FIG. 12 depicts a configuration of functional blocks of an image processing apparatus 128 built in the head-mounted display 100. The functional blocks can be implemented, in hardware, from such a configuration of the image processing integrated circuit 120 and so forth as depicted in FIG. 8, and can be implemented, in software, from a program that is loaded from a recording medium into the main memory or the like and demonstrates various functions such as a data inputting function, a data holding function, an image processing function, and a communication function.

In the example depicted in FIG. 12, the image processing apparatus 128 includes a signal processing unit 150, an image analysis unit 152, a first correction unit 156, a signal processing unit 158, a merge unit 160, a second correction unit 162, and an image display controlling unit 164. The signal processing unit 150 is implemented by the signal processing circuit 42 of FIG. 8, and acquires data of a captured image from the image sensor of the stereo camera 110 and performs suitable processing for the data. The image analysis unit 152 is implemented from the CPU 32, the image analysis circuit 46, and the input/output interface 30 of FIG. 8, and analyzes a captured image to acquire predetermined information and transmits the information to the content processing apparatus 200.

For example, the image analysis unit 152 determines a distance to an imaging target by stereo matching using left and right captured images and generates a depth map in which such distances are represented as pixel values on the image plane. The position or the posture of the head-mounted display 100 may be acquired by SLAM. Further, it can be recognized by those skilled in the art that various contents are available as the substance of the image analysis.

However, in some cases, the image analysis unit 152 may transmit the data itself of the captured image processed by the signal processing unit 150 to the content processing apparatus 200.

In this case, the signal processing unit 150 includes the input/output interface 30 of FIG. 8. Further, an analysis result by the image analysis unit 152 or measurement values of the motion sensors not depicted built in the head-mounted display 100 may be used for an image transformation process. In particular, a movement of the gaze of the user in a period of time used for processing in the inside of the head-mounted display 100 and data transfer to the content processing apparatus 200 may be specified on the basis of parameters of them and dynamically reflected on the displacement vector map.

The signal processing unit 150 may further carry out a super-resolution process for providing a very high definition to a captured image by a predetermined method. For example, an image obtained by displacing a captured image with a width smaller than one pixel in the horizontal and vertical directions of the image plane and the image before the displacement are merged to sharpen the image. For the super-resolution process, various other methods have been proposed, and any of them may be adopted.

The first correction unit 156 is implemented by the CPU 32 and the image correction circuit 34 of FIG. 8, and corrects a captured image as indicated by S14 of FIG. 4 to generate a display image having distortion for the eyepieces. However, in a case where an image transmitted from the content processing apparatus 200 is to be merged, the first correction unit 156 does not perform chromatic aberration correction. In particular, same distortion is provided to all primary colors. Images of all of red, green, and blue are corrected using a displacement vector map having been generated for green taking a characteristic of the eyes of a human being who views the display panel into consideration. In addition, in a case where a RAW image acquired by the image sensor has a Bayer array, the image of green of the highest pixel density can be used.

In the case of the see-through mode in which a captured image is displayed without being merged with another image, display images for which up to chromatic aberration correction is performed by the first correction unit 156 as described above may be generated all at once. In particular, using the displacement vector maps prepared for red, green, and blue, captured images of the colors are corrected. The signal processing unit 158 is implemented by the CPU 32, the input/output interface 30, and the decoding circuit 48 of FIG. 8, and decodes and decompresses data transmitted from the content processing apparatus 200 or the relay apparatus 310.

The merge unit 160 is implemented by the CPU 32 and the image merge circuit 36 of FIG. 8, and merges a graphics image transmitted from the content processing apparatus 200 or the like with a captured image corrected by the first correction unit 156. The merge unit 160 separates the graphics image and an α image or decompresses the graphics image and the α image, which are in a reduced state, in a predetermined direction to restore original images as occasion demands.

The second correction unit 162 is implemented by the CPU 32 and the image correction circuit 34 of FIG. 8 and corrects an image inputted from the merge unit 160. However, the second correction unit 162 carries out only a correction process that has not been carried out as yet from among the correction processes to be performed for a display image, namely, only a correction process for chromatic aberration. In a case where, in the related art, a display image for which up to merging has been performed by the content processing apparatus 200 is to be transmitted to and displayed on the head-mounted display 100, generally a merged image free from distortion is generated and then chromatic aberration correction is performed together with correction for the eyepieces. In contrast, in the present embodiment, since data paths different from each other are used for a captured image and an image to be merged with the captured image, the correction process is separated into two stages.

In particular, common distortion corresponding to the eyepieces is provided to an image transmitted from the content processing apparatus 200 and a captured image, and correction is performed for each color after merging. The second correction unit 162 performs further suitable correction for the red and blue images among the images after merging to complete the images. By first performing correction with reference to green of a wavelength band to which the visual sensitivity of a human being is highest and performing scaling, super-resolution, merging, and so forth and thereafter correcting the aberrations for red and blue, color bleeding or abnormality of a contour becomes less likely to be visually recognized. However, this does not intend to restrict the sequence of colors to be used for correction. By leaving correction of chromatic aberration so as to be performed after merging, the boundary line for merging can be defined precisely.

In particular, if merging is performed after chromatic aberration is corrected, then a boundary line set for an image for chroma keying or an α image comes to include an error depending upon a primary color, and this gives rise to color bleeding in the contour after merging. By displacing pixels by a very small amount by chromatic aberration correction after merging in a state free from color displacement, a display image having no bleeding on a contour thereof can be generated. In such processes as scaling, super-resolution, and merging of an image, generally a filter process such as a bilinear or trilinear filter process is used. If such filter processes are carried out after chromatic aberration is corrected, then a result of the chromatic aberration correction is destroyed on the microscopic level and, upon displaying, color bleeding or abnormality of a contour occurs. Where the process by the second correction unit 162 is performed immediately before displaying, such problems as described above can be avoided. The image display controlling unit 164 is implemented by the display controller 44 of FIG. 5 and sequentially outputs display images generated in this manner to the display panel 122.

It is to be noted that the compression encoding unit 260 of the content processing apparatus 200, the data decomposition unit 314 and the compression encoding unit 316 of the relay apparatus 310, and the signal processing unit 158 of the image processing apparatus 128 may perform compression encoding, decoding and decompression, and motion compensation for each of unit regions into which the image plane is divided. Here, the unit regions are regions into which the image plane is divided in the horizontal direction for each predetermined number of rows of pixels such as, for example, one row or two rows or are rectangular regions into which the image plane is divided in both of the vertical and horizontal directions such as 16×16 pixels or 64×64 pixels.

At this time, each of the functional blocks described above starts a compression encoding process and a decoding decompression process every time data of a processing target for one unit region is acquired and outputs data after the processes for each unit region. Where a functional block that is involved in a series of processes including compression encoding and decoding decompression in a unit of data of pixels in a unit region, smaller than the total number of pixels of the display image, performs input/output control, a sequence of data can be processed and transferred with small delay.

Figure 13A:
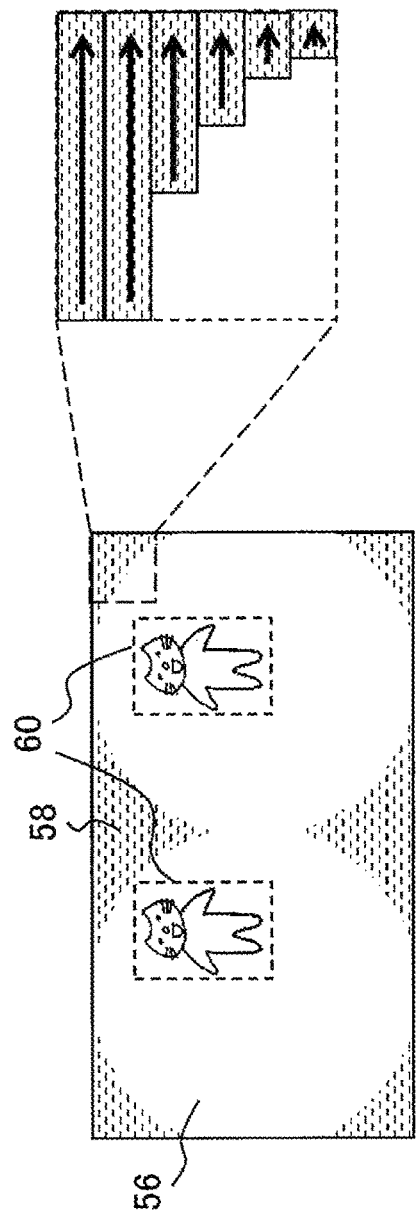
FIGS. 13A to 13C are views exemplifying a configuration of an image in which a graphics image and an α image are integrated by the content processing apparatus.
Figure 13B:
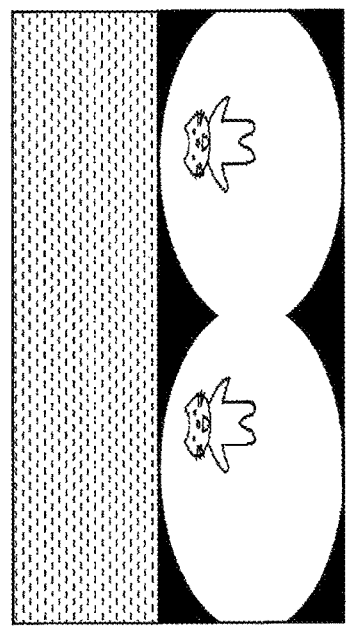
Figure 13C:
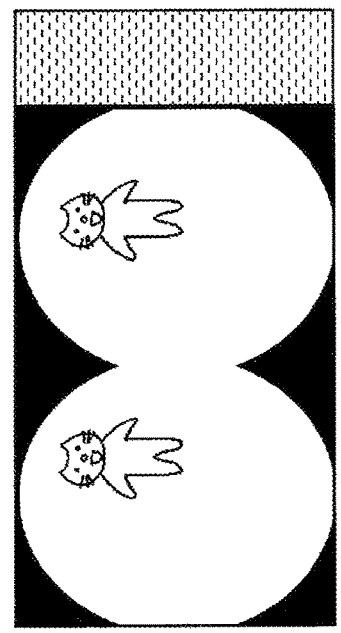

FIGS. 13A to 13C exemplify configurations of an image in which a graphics image and an α image are integrated by the content processing apparatus 200. In the configuration of FIG. 13A, data of an α image are embedded in a region 58 other than α range 56 in which a graphics image is represented in the image plane for one frame. In particular, since an image to be displayed on the head-mounted display 100 has distortion for the eyepieces provided thereto as described above, the range 56 of the graphics image does not have a rectangular shape.

On the other hand, since data to be transmitted is presupposed to be data on a rectangular plane whose dimensions in the transverse direction and the lateral direction are defined, the region 58 that is not used appears between the rectangular plane and the range 56 of the graphics image. Therefore, the merge information integration unit 256 of the content processing apparatus 200 fills the region 58 with a values. For example, as depicted in an enlarged scale on the right side in FIG. 13A, pixel sequences of a raster order of the α image are successively placed from the left to the right and from above to below such that the region 58 is filled up with the pixel sequences.

In the configuration of FIG. 13B, an α image and a graphics image are individually reduced in the vertical direction and connected up and down to form one image plane. In the configuration of FIG. 13C, a graphics image and an α image are reduced in the horizontal direction and connected left and right to each other to form one image plane. In the configurations of FIGS. 13B and 13C, the reduction ratios of the graphics image and the α image may be equal to or different from each other. In any case, according to the configurations, it is possible to easily transmit an α image even if a standard that does not support the channel for an α value is applied. It is to be noted that, in the configurations of FIGS. 13B and 13C, the graphics image may not be an image to which such distortion as depicted in FIG. 13B or 13C is provided. In other words, the image may be an image that is generated presupposing that it is to be displayed on a flat panel display and is free from distortion.

It is to be noted that, in the configurations, the resolution of the α image may be lower than the resolution of the graphics image. For example, according to the configuration of FIG. 13A, depending upon a degree of distortion of the eyepieces, the area of the region 58 may not be sufficient. Therefore, the α image is reduced to ½ or to ¼ in both of the vertical and horizontal directions or the like such that it can be included in the image plane for one frame together with a graphics image. Alternatively, in regard to the α image, only data in a predetermined region including a drawn object may be determined as a transmission target.

In particular, upon merging, the α value is significant in the region of the object to be merged and in the proximity of the contour of the region, and it is apparent that a region apart from the object remains as the captured image. Therefore, as depicted in FIG. 13A, only an α image of a region 60 of the predetermined range including the object is cut out and made a target of embedding. Here, the region of the predetermined range is a circumscribed rectangle of a virtual object, a region obtained by adding a marginal region of a predetermined width to the circumscribed rectangle, or the like. In this case, also information relating to the position and the size of the region 60 is embedded simultaneously. In a case where a plurality of virtual objects are to be drawn, naturally the number of regions of α images to be cut out is a plural number.

FIGS. 14A to 14G exemplify a data structure of pixel values of an α image to be integrated with a graphics image by the content processing apparatus 200. Here, a data structure in a case where each pixel value of the graphics image is represented by 24 bits (each of the luminances of red (R), green (G), and blue (B) is represented by 8 bits) is assumed. A rectangle represented as "A" in FIGS. 14A to 14G indicates a bit width representative of one α value. In the data structure of FIG. 14A, an α value is represented by 1 bit and α values for 8×3=24 pixels represent data of one pixel on the image. Similarly, in the data structures of FIGS. 14B, 14C, and 14D, an α value is represented by 2 bits, 4 bits, and 8 bits such that data of one pixel on the image is configured from 12 pixels, 6 pixels, and 3 pixels, respectively.

Meanwhile, in the data structures of FIGS. 14E, 14F, and 14G, an α value for one pixel is associated with each color. In particular, although the number of bits representative of an α value differs like 1 bit, 2 bits, and 4 bits, in any of the structures, α values for 1×3=3 pixels are data of one pixel on the image. In a case where translucent merging is not performed, since the α value is 0 or 1, it is sufficient if the data structure of FIG. 14A or 14E is used. An appropriate data structure is selected taking the gradation suitable for the transparency, the resolution, the region area of a transmission target, and so forth into consideration additionally.

Further, in regard to an actual display image, it may be necessary to perform chromatic aberration correction for providing positional displacement by a very small amount to a figure of an object in images of the channels for red, green, and blue such that the images can look visually coincident with each other. Also, in regard to an image to be generated by the content processing apparatus 200, in a case where such chromatic aberration correction is carried out, it may be necessary to generate an α image for each color in accordance with positional displacement of a figure. In this case, the α images themselves have channels for red, green, and blue. Accordingly, in the data structures depicted in FIGS. 14A to 14G, for the channels for red, green, and blue, α values of red, α values of green, and α values of blue are placed.

As a result, the data size of α values that can be placed in one pixel on an image is ⅓ that of an alternative case in which α values common to all colors are set as described above. However, also it is conceivable that the content processing apparatus 200 does not perform chromatic aberration correction but the head-mounted display 100 performs chromatic aberration correction after it performs merging. In this case, since α values common to all colors can be set, a greater amount of information can be placed in one pixel.

Figure 15:
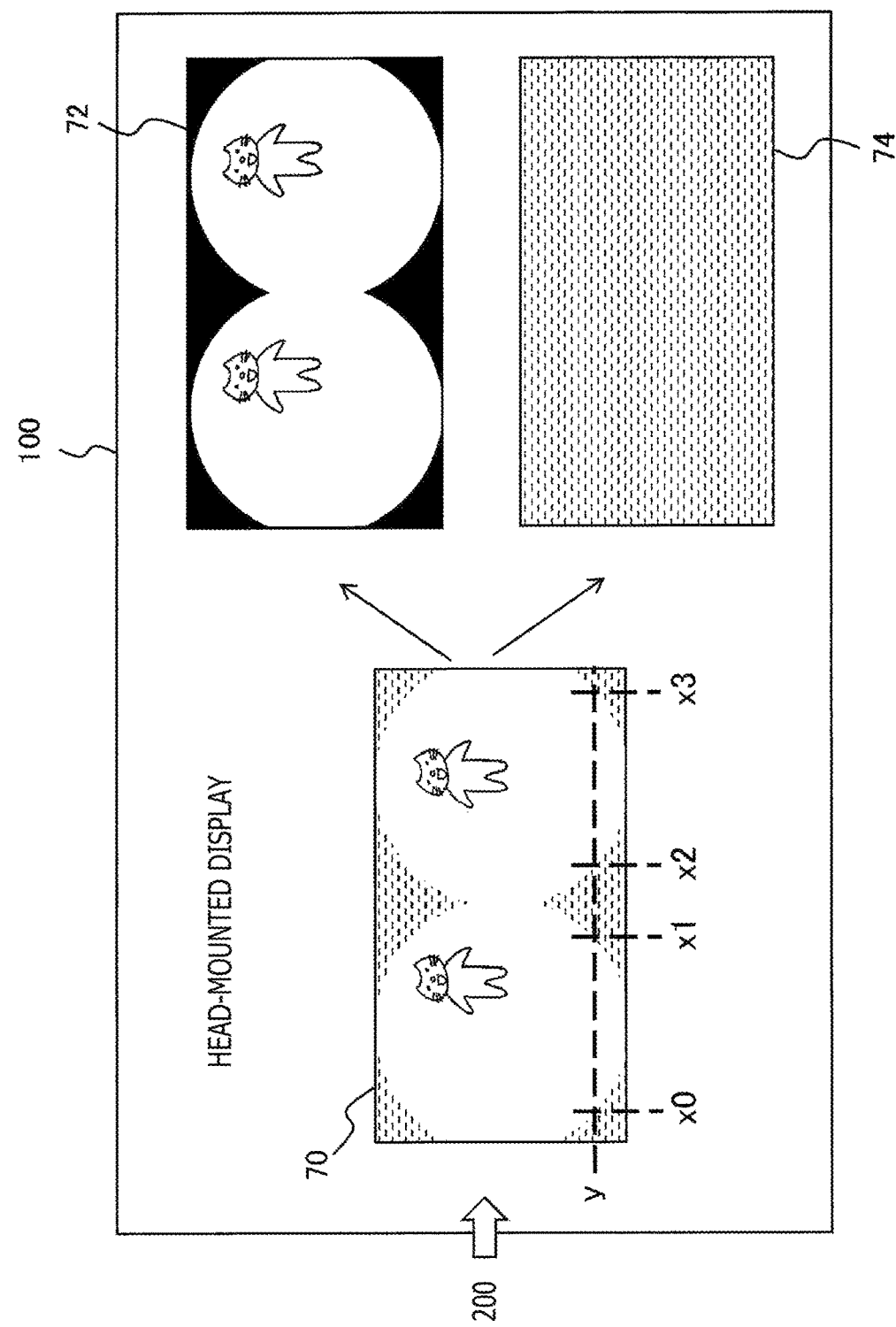
FIG. 15 is a view depicting a procedure of processing in a case where data of an α image is embedded into and transmitted together with a region in which a graphics image is not represented.

FIG. 15 depicts a procedure of processing in a case where data of an α image is embedded into a region in which a graphics image is not represented as depicted in FIG. 13A and transmitted together with the graphics image. In the case where the transmission data is configured in this manner, since extraction of the α image becomes comparatively complicated, it is desirable to transmit the transmission data by wired transmission from the content processing apparatus 200 directly to the head-mounted display 100 as indicated by FIG. 7A. This makes it possible to reversibly compress data and implement merging of high accuracy.

After the merge unit 160 of the head-mounted display 100 acquires data of an image 70 in which an α image has been embedded in this manner, it separates the α image from the graphics image. In particular, the merge unit 160 sequentially scans pixel sequences from left to right from the top row of the image plane to extract pixel values in a range within which α values are represented. Here, in the region in which α values are represented, a plurality of α values are placed in one pixel as depicted in FIGS. 14A to 14G. Accordingly, the merge unit 160 decomposes them into one pixel and arranges such pixels in a raster order on a plane of the α image 74.

For example, in the yth row depicted in FIG. 15, pixel values from the left end pixel to the pixel at x0 are read out, and then pixel values from x1 to x2 and from x3 to the right end are read out. The range of pixels that express α values on the image plane in this manner is derived for each row on the basis of the design of the eyepieces or the like and is shared by the content processing apparatus 200 and the head-mounted display 100. It is also possible that a map in which a range of pixels to embed α values is represented on the image plane is generated in advance and shared by the content processing apparatus 200 and the head-mounted display 100. Since this separates a graphics image 72 and the α image 74 from each other, the merge unit 160 generates a display image by merging the graphics image with the captured image using the α values as depicted in FIG. 5. It is to be noted that, in a case where the graphics image 72 and the captured image has not been subject to chromatic aberration correction, the merge unit 160 carries out chromatic aberration correction for an image after merging. This similarly applies also to various forms hereinafter described.

Figure 16:
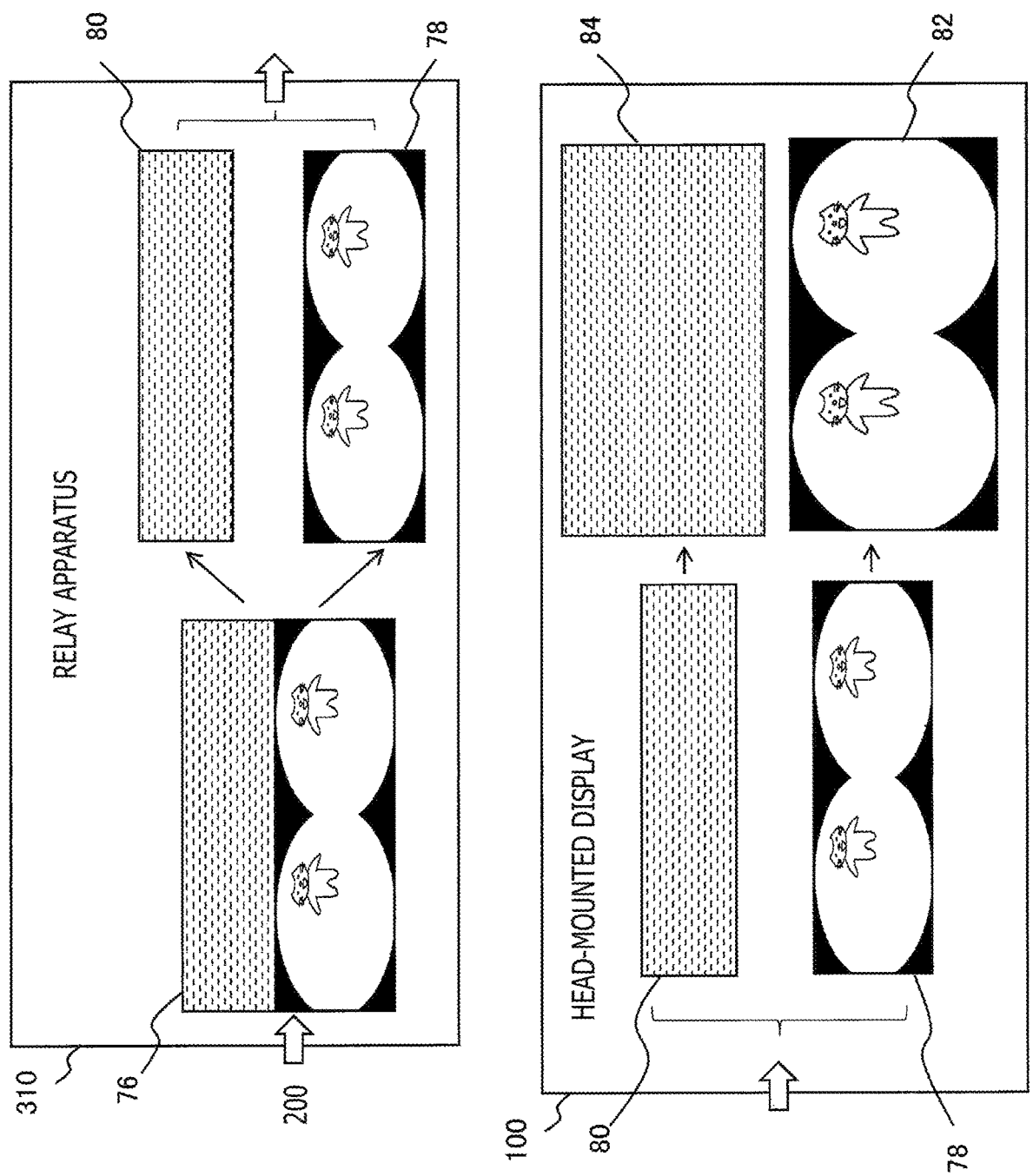
FIG. 16 is a view depicting a procedure of processing in a case where an α image and a graphics image are transmitted in a state in which they are individually reduced in a vertical direction and connected to each other in the vertical direction.

FIG. 16 depicts a procedure of processing in the case where an α image and a graphics image are reduced in the vertical direction and connected up and down to each other as depicted in FIG. 13B and then transmitted. In this case, the α image and the graphics image may be transmitted from the content processing apparatus 200 directly by wired transmission to the head-mounted display 100 as depicted in FIG. 7A or may be transmitted by wireless transmission from the relay apparatus 310 to the head-mounted display 100 after they are transmitted once to the relay apparatus 310 as depicted in FIG. 7B. FIG. 16 depicts the latter case.

If the data decomposition unit 314 of the relay apparatus 310 receives data of an image 76 from the content processing apparatus 200, then it separates the data into an α image 80 and a graphics image 78. Therefore, to the data decomposition unit 314, a position of a boundary line between the α image and the graphics image, which depends upon a reduction ratio of them in the vertical direction, is set in advance. The α image 80 and the graphics image 78 separated from each other are compression-encoded by the compression encoding unit 316 while they remain in the state in which they are reduced in the vertical direction. As described above, for the graphics image 78, an encoding method of a high compression ratio is selected, and for the α image 80, an encoding method of a low compression ratio is selected.

Then, the communication unit 312 transmits the two kinds of compression encoded data to the head-mounted display 100 by wireless transmission. However, actually the relay apparatus 310 acquires the data in order from the top low of the image 76, compression-encodes the data in order from the top row in parallel to the acquisition, and transmits the compression-encoded data to the head-mounted display 100. Accordingly, in the example depicted in FIG. 16, data of the α image 80 are transmitted first, and then data of the graphics image 78 are transmitted.

The signal processing unit 158 of the head-mounted display 100 decodes and decompresses the two kinds of data by respective corresponding methods. The merge unit 160 acquires the α image 80 and the graphics image 78 after the decoding and decompression and enlarges them in the vertical direction to form an α image 84 and a graphics image 82 of the original sizes. It is to be noted that, in a case where a plurality of α values are placed in one pixel in the transmitted data, the merge unit 160 suitably decomposes the plurality of α values to generate an α image 84. Then, the merge unit 160 merges the graphics image 82 with the captured image using the α image 84 as depicted in FIG. 5 to generate a display image.

Figure 17:
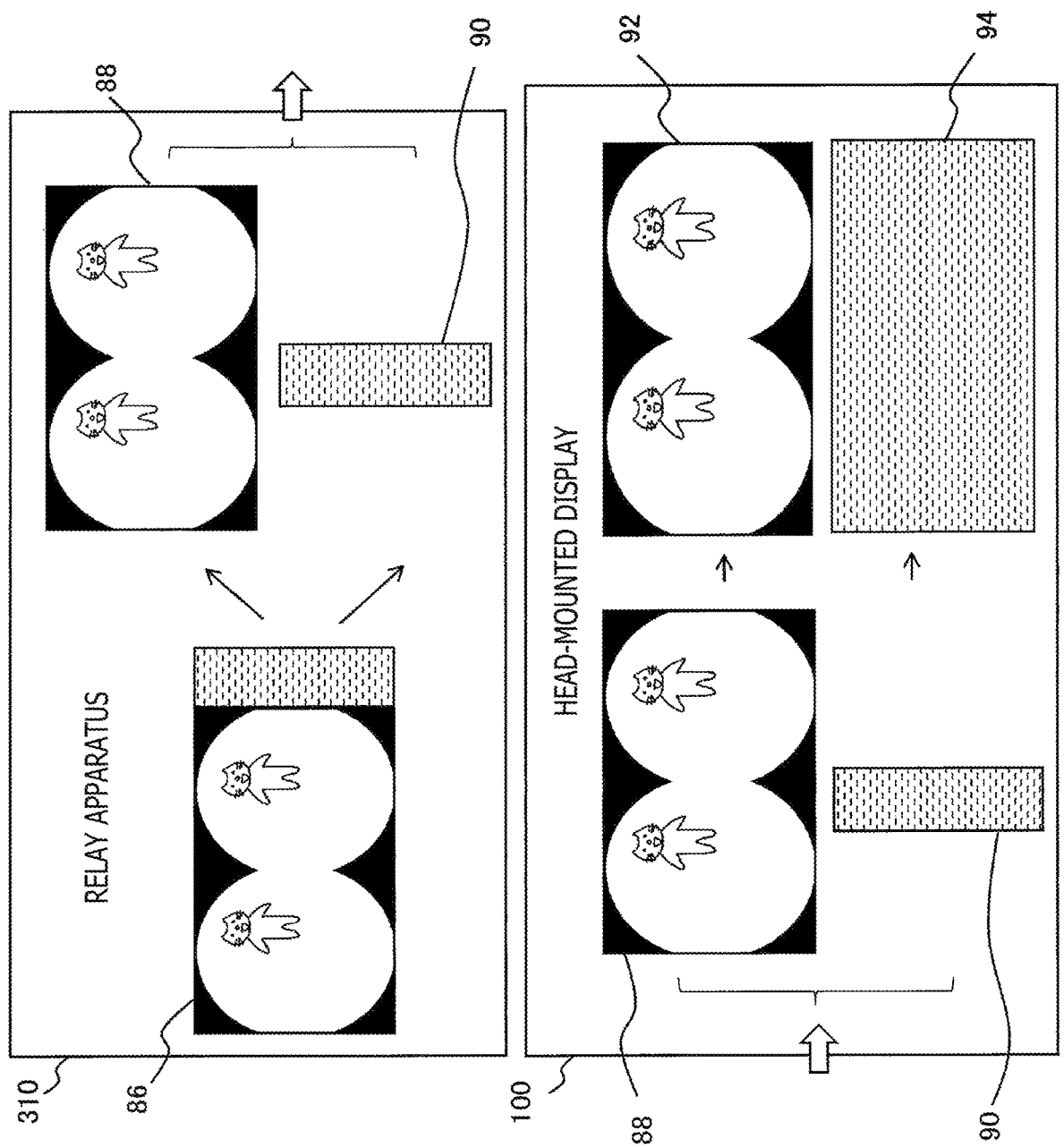
FIG. 17 is a view depicting a procedure of processing in a case where an α image and a graphics image are transmitted in a state in which they are individually reduced in a horizontal direction and connected to each other in the horizontal direction.

FIG. 17 depicts a procedure of processing in the case where a graphics image and an α image are reduced in the horizontal direction and connected left and right to each other as depicted in FIG. 13C and then transmitted. Also, in this case, they may be transmitted from the content processing apparatus 200 directly to the head-mounted display 100 by wired transmission as depicted in FIG. 7A, or they may be transmitted first to the relay apparatus 310 once and then transmitted from the relay apparatus 310 to the head-mounted display 100 by wireless transmission as depicted in FIG. 7B. FIG. 17 depicts transmission of the latter case.

If the relay apparatus 310 acquires data of an image 86 from the content processing apparatus 200, then the data decomposition unit 314 thereof separates the data into a graphics image 88 and an α image 90. Therefore, to the data decomposition unit 314, a position of a boundary line between the graphics image and the α image, which depends upon a reduction ratio of them in the horizontal direction, is set in advance. The graphics image 88 and the α image 90 separated from each other are compression-encoded by the compression encoding unit 316 while they remain in the state in which they are reduced in the horizontal direction. As described above, for the graphics image 88, an encoding method of a high compression ratio is selected, and for the α image 90, an encoding method of a low compression ratio is selected.

Then, the communication unit 312 transmits the two kinds of compression-encoded data to the head-mounted display 100 by wireless transmission. However, actually the relay apparatus 310 acquires the data in order from the top row of the image 86, compression-encodes the data in order from the top row in parallel to the acquisition, and transmits the compression-encoded data to the head-mounted display 100. Accordingly, in the example depicted in FIG. 17, data of the graphics image for one row and data of the α image for one row are transmitted alternately.

The signal processing unit 158 of the head-mounted display 100 decodes and decompresses the two kinds of data by respective corresponding methods. The merge unit 160 acquires the graphics image 88 and the α image 90 after the decoding and decompression and enlarges them in the horizontal direction to form a graphics image 92 and an α image 94 of the original sizes. It is to be noted that, in a case where a plurality of α values are placed in one pixel in the transmitted data, the merge unit 160 suitably decomposes the plurality of α values to generate an α image 94. Then, the merge unit 160 merges the graphics image 92 with the captured image using the α image 94 as depicted in FIG. 5 to generate a display image.

In order to appropriately implement stereoscopic vision on the head-mounted display 100, it is significant that a binocular parallax is provided with high accuracy between display images. As depicted in FIG. 16, in the case where images reduced in the vertical direction are connected to each other and transmitted, since the resolution in the horizontal direction is maintained, this is advantageous in stereoscopic vision. On the other hand, in the mode of FIG. 16, transmission of a graphics image is started after α images in the overall region are transmitted as described hereinabove. Accordingly, also in the head-mounted display 100, the merge unit 160 has to start, after it acquires α images in the overall regions, merging of a graphics image that is acquired later, and delay of a period for acquisition of an α image occurs.

Although transmission of an α image having a smaller data size first can reduce the delay time period compared to that where a graphics image is transmitted first, in both cases, a waiting time period occurs until both data become complete. Based on this, in the case where a graphics image and an α image are to be reduced in the vertical direction, the content processing apparatus 200 may transmit a graphics image and an α image successively and alternately for each one or more rows. This makes it possible to further reduce the waiting time until both data become complete.

In the case where images reduced in the horizontal direction are connected to and transmitted together with each other as depicted in FIG. 17, since the resolution in the horizontal direction decreases, an error is included in the binocular parallax and may possibly have an influence on the stereoscopic vision. On the other hand, since data of a graphics image and an α image are included in one row as described above, it is possible to efficiently progress merging for each row and minimize the delay time. Based on the characteristics of the configurations depicted in FIGS. 16 and 17, an appropriate configuration is selected in accordance with a balance among demanded accuracy for stereoscopic vision, permissible delay time, and so forth.

With the present embodiment described above, in a technology for causing a head-mounted display including a camera to display an image of content, separately from a path for displaying an image transmitted from a content processing apparatus, a path for processing and displaying a captured image in and on the head-mounted display is provided. In a case where it is tried to implement AR or MR, only an analysis result of the captured image is transmitted from the head-mounted display to the content processing apparatus, and the head-mounted display merges a graphics image drawn in response to the analysis result of the captured image by the content processing apparatus with the captured image.

Consequently, while the content processing apparatus can draw a high definition image, the size of data to be transferred to and from the head-mounted display can be reduced, and the time and the power consumption for the processes and data transmission can be reduced. Further, in a case where an α image used for merging is to be transmitted together with a graphics image, by integrating them into one image data, the data can be transmitted even by a communication standard that does not support data transmission of an α image. At this time, by embedding the α image into a gap region arising from distortion provided to the graphics image in an image plane of a transmission target and transmitting the same by wired communication, the graphics image can be merged without being degraded.

As an alternative, a graphics image and an α image are reduced in the vertical direction or the horizontal direction and connected to each other such that they are transmitted as one image data. In this case, a relay apparatus separates them once and compression-encodes the graphics image with a high compression ratio while the α image is reversibly compressed, and then the graphics image and the α image are transmitted to the head-mounted display. Consequently, the data size to be transmitted can be reduced while the influence upon the accuracy upon merging is suppressed. As a result, data transmission to the head-mounted display can be implemented by wireless transmission, and the movable range of the user can be expanded.

The present disclosure has been described in connection with the embodiment thereof. The embodiment is exemplary, and it is recognized by those skilled in the art that variable modifications are possible in regard to combinations of the components or the processes of the embodiment and that also such modifications fall within the scope of the present disclosure.

What is claimed is:

1. An image data transmission method comprising:
by an image generation apparatus,
generating a graphics image and an alpha image,
wherein the graphics image comprises one frame,
wherein the alpha image comprises only an alpha value for each pixel in the graphics image, and
wherein the alpha value represents a transparency of a pixel in the graphics image;
generating merging data for forming a display image,
wherein the merging data includes data for joining the graphics image and the alpha image into a single image plane without overlap between the graphics image and the alpha image; and
transmitting the merging data to a display apparatus,
wherein the generating data for merging adds, to the graphics image, distortion to be appreciated through an eyepiece and embeds the alpha value into a region in which the graphics image is not represented due to the distortion on the single image plane.

2. The image data transmission method according to claim 1, wherein the reverse distortion is applied to the graphics image prior to generating the display image,
wherein the reverse distortion corrects for chromatic aberration of an eyepiece of a head mounted display (HMD).

3. The image data transmission method according to claim 1, wherein the alpha image is compressed in a vertical direction or a horizontal direction before generating the display image, and
wherein the graphics image is joined to the alpha image along a common border in the single image plane in accordance with the merging data.

4. The image data transmission method according to claim 1, wherein the alpha image and the graphics image are separately compressed before generating the display image, and
wherein the alpha image and the graphics image are each divided into unit regions, wherein the display image is formed by alternately joining unit regions of the alpha image to unit regions of the graphics image alternately on the single image plane.

5. The image data transmission method according to claim 1, wherein alpha values of a plurality of pixels in the graphics image are associated with one pixel in the alpha image.

6. The image data transmission method according to claim 5, wherein the generating merging data places an α value of one or a plurality of pixels for each of storage regions allocated to a plurality of primary colors each of the plurality of pixels has.

7. The image data transmission method according to claim 5, wherein the generating the merging data places an α value of one or a plurality of pixels set to each of a plurality of primary colors for each of storage regions allocated to the plurality of primary colors each of the plurality of pixels has.

8. The image data transmission method according to claim 5, wherein the generating the merging data places an α value of one or a plurality of pixels set in common to all of a plurality of primary colors for each of storage regions allocated to the plurality of primary colors each of the plurality of pixels has.

9. The image data transmission method according to claim 1, further comprising:
by a relay apparatus,
acquiring the merging data;
separating the display image into the graphics image and the alpha image using the merging data;
compression-encoding the graphics image by a first compression method and the alpha image by a second compression method different from the first compression method; and
transmitting the compression-encoded data to the display apparatus.

10. The image data transmission method according to claim 9, wherein the first compression method irreversibly compresses the graphics image and the second compression method compresses the alpha image.

11. The image data transmission method according to claim 1, further comprising:
by the display apparatus,
acquiring information of a position and a posture of an imaging target, wherein
the generating merging data predicts a position and a posture of the imaging target after a predetermined period of time on a basis of the information of the position and the posture of the display apparatus and generates the display image so as to correspond to a result of the prediction.

12. The image data transmission method according to claim 1, wherein the generating merging data represents an alpha value on the image plane on a basis of information relating to a range representing the alpha value, which is shared with the display apparatus.

13. The image data transmission method according to claim 12, wherein the merging data represents an alpha value on the image plane on a basis of a map in which a range representative of the alpha value is represented on the image plane.

14. The image data transmission method according to claim 1, wherein the graphics image has a higher resolution than the alpha image.

15. The image data transmission method according to claim 1, wherein the generating data for merging represents, on the image plane, an alpha value in a region of a predetermined range including a figure represented by the merging from within the display image.

16. The image data transmission method according to claim 1, wherein the generating merging data generates further data in which a predetermined pixel value is provided to a region other than a figure to be represented by the merging in place of representing data of the alpha value on the image plane,
the transmitting irreversibly compresses and transmits the alpha image, and
the display apparatus executes
decompressing the alpha image merging, and representing, in the display image, a region other than a region of pixels having values within a predetermined range from the predetermined pixel value from among the further data.

17. The image data transmission method according to claim 1, wherein the reverse distortion is applied to the graphics image prior to generating the display image,
wherein the generating merging data embeds, to the graphics image, the alpha value into a region in which the graphics image is not represented due to distortion on the image plane.

18. A content processing apparatus comprising:
an image drawing unit configured to generate a graphics image and an alpha image,
wherein the graphics image comprises one frame,
wherein the alpha image only comprises an alpha value for each pixel in the graphics image, and
wherein the alpha value represents a transparency of a pixel in the graphics image;
a merge information integration unit configured to generate merging data for joining the graphics image and the alpha image into a single image plane without overlap between the graphics image and the alpha image; and
a communication unit configured to output the merging data,
wherein the merge information integration unit adds, to the graphics image, distortion to be appreciated through an eyepiece and embeds the alpha value into a region in which the graphics image is not represented due to the distortion on the single image plane.

19. The content processing apparatus according to claim 18, wherein the image drawing unit adds, to the graphics image, reverse distortion to correct chromatic aberration when the display image is through an eyepiece.

20. A head-mounted display comprising:
a camera configured to image an actual space;
an image processing integrated circuit configured to receive, from an external apparatus, merging data for merging a captured image and an alpha image to generate a display image,
wherein the captured image is captured by the camera,
wherein the alpha image only comprises an alpha value for each pixel in the captured image, and
wherein the alpha value represents a transparency of a pixel in the captured image,
wherein the image processing integrated circuit forms a display image by joining the captured image and the alpha image using the merging data; and
a display panel configured to output the display image,
wherein the graphics image comprises distortion to be appreciated through an eyepiece and an embedded alpha value in a region in which the graphics image is not represented due to distortion.

21. The head-mounted display according to claim 20, wherein the image processing integrated circuit adds reverse distortion to the captured image to correct for chromatic aberration when the merged image is viewed through an eyepiece.

22. The head-mounted display according to claim 20, wherein the image processing integrated circuit analyzes the captured image to acquire information of a position and a posture of an imaging target and transmits the information to the external apparatus.

23. A relay apparatus comprising:
a data separation unit configured to separate a graphics image and an alpha image joined within a display image,
wherein the alpha image comprises only an alpha value for each pixel in the graphics image, and
wherein the graphics images comprises distortion to be appreciated through an eyepiece and the alpha value is embedded into a region in which the graphics image is not represented due to the distortion on a single image plane;
a compression encoding unit configured to compression-encode the graphics image by a first compression method and the alpha image by a second compression method different from the first compression method; and
a communication unit configured to acquire merging data from display apparatus that generates a display image and transmit the merging data to the display apparatus.

24. A content processing system comprising:
a display apparatus; and
a content processing apparatus configured to generate a display image;
the content processing apparatus including
a merge data generation unit configured to generate merging data for joining a captured image with an alpha image,
wherein the alpha image comprises only an alpha value for each pixel in the graphics image, and
wherein the alpha value representative of a transparency of a pixel of the captured image, and
a communication unit configured to output the merging data;
the display apparatus including
a camera configured to image an actual space,
an image processing integrated circuit configured to join the alpha image with the captured image using the merging data to generate a display image without overlap between the graphics image and the alpha image, and
a display panel configured to output the display image,
wherein the image processing integrated circuit adds, to the graphics image, distortion to be appreciated through an eyepiece and embeds the alpha value into a region in which the graphics image is not represented due to the distortion on the single image plane.

* * * * *